United States Patent [19]
Tamura et al.

[11] Patent Number: 6,081,095
[45] Date of Patent: Jun. 27, 2000

[54] VOLTAGE BALANCER DEVICE FOR COMBINATION BATTERY

[75] Inventors: Hiroshi Tamura, Kariya; Hideji Yoshida, Hashima; Tetsuya Nagata, Konan, all of Japan

[73] Assignee: Denso Corporation, Kariya, Japan

[21] Appl. No.: 09/265,583

[22] Filed: Mar. 10, 1999

[30]   Foreign Application Priority Data

Mar. 13, 1998  [JP]  Japan .................................. 10-062577
Sep. 3, 1998   [JP]  Japan .................................. 10-249841

[51] Int. Cl.[7] ...................................................... H02J 7/00
[52] U.S. Cl. .......................................................... 320/118
[58] Field of Search ..................................... 320/116, 117, 320/118, 119, 122, FOR 114, FOR 116, FOR 117

[56]              References Cited

U.S. PATENT DOCUMENTS

| 5,206,578 | 4/1993 | Nor ......................................... 320/118 |
| 5,387,857 | 2/1995 | Honda et al. . |
| 5,504,415 | 4/1996 | Podrazhansky et al. ................ 320/118 |
| 5,648,713 | 7/1997 | Mangez . |
| 5,710,504 | 1/1998 | Pascual et al. ....................... 320/118 X |

FOREIGN PATENT DOCUMENTS

| 282033 | 9/1988 | European Pat. Off. ...... 320/FOR 116 |
| 2-136445 | 11/1990 | Japan . |
| 6-253463 | 9/1994 | Japan . |
| 8-19188 | 1/1996 | Japan . |
| 8-213055 | 8/1996 | Japan . |

*Primary Examiner*—Edward H. Tso
*Attorney, Agent, or Firm*—Pillsbury Madison & Sutro LLP

[57]              ABSTRACT

A large number of rechargeable unit cells connected in series forming a combination battery are divided into groups of cells, each group including several cells, preferably, three to five cells. Voltage unevenness among the cells in each group is eliminated by operation of a voltage balancer device connected to each group of cells. The voltage balancer device includes a circuit for equally dividing a terminal voltage of the group of cells and obtaining an average voltage among the cells. The average voltage is compared with an individual cell voltage, and the cells having a voltage higher than the average voltage are discharged so that all cell voltages in the group become equal. A plurality of the battery modules each including the group of cells and the voltage balancer device are connected in series to form a single combination battery, and voltage unevenness among the battery modules are controlled by another voltage control device. The voltage unevenness among cells in a group may be eliminated by charging a capacitor from cells having a higher voltage and charging cells having a lower voltage from the charged capacitor. Thus, the voltage unevenness among the combination battery cells is eliminated by a simple and inexpensive device.

14 Claims, 15 Drawing Sheets

FIG. 2
| COMPARATOR | | | | SWITCH | | |
|---|---|---|---|---|---|---|
| 28H | 28L | 27H | 27L | 35(3) | 35(2) | 35(1) |
| H | X | X | X | 1 | 0 | 0 |
| L | X | H | X | 0 | 1 | 0 |
| X | H | X | L | 0 | 1 | 0 |
| X | X | X | H | 0 | 0 | 1 |
| L | L | L | L | 0 | 0 | 0 |
FIG. 3
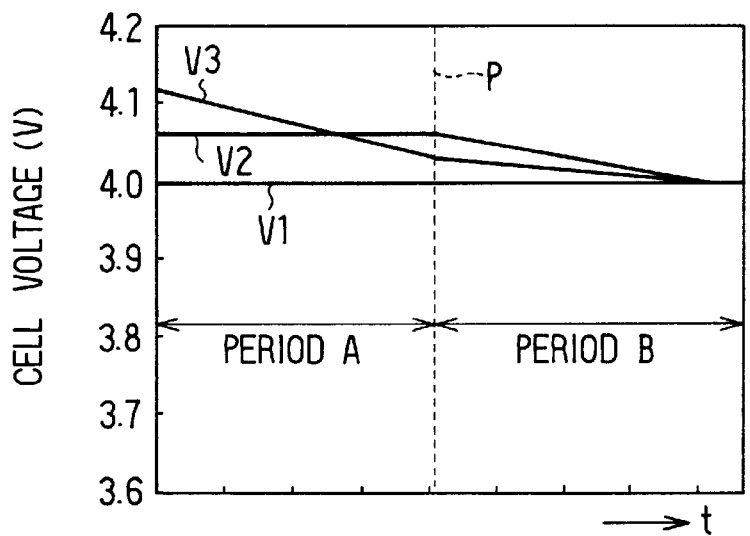
FIG. 4
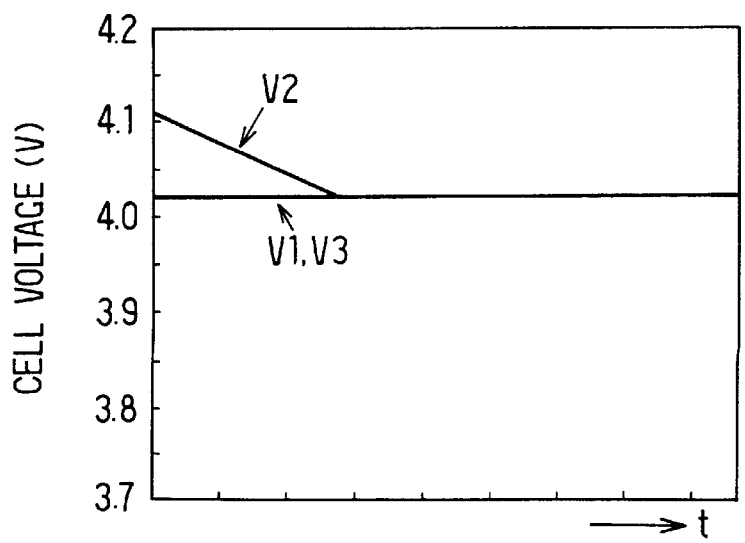

FIG. 7

| COMPARATOR | | | | | | SWITCH | | | |
|---|---|---|---|---|---|---|---|---|---|
| 41H | 41L | 28H | 28L | 27H | 27L | 35(4) | 35(3) | 35(2) | 35(1) |
| H | X | X | X | X | X | 1 | 0 | 0 | 0 |
| L | X | H | X | X | X | 0 | 1 | 0 | 0 |
| X | H | X | L | X | X | 0 | 1 | 0 | 0 |
| X | X | L | X | H | X | 0 | 0 | 1 | 0 |
| X | X | X | H | X | L | 0 | 0 | 1 | 0 |
| X | X | X | X | X | H | 0 | 0 | 0 | 1 |
| L | L | L | L | L | L | 0 | 0 | 0 | 0 |

FIG. 10

| COMPARATOR | | | | | | SWITCH | | |
|---|---|---|---|---|---|---|---|---|
| ---$CP_{i+1}$ | $CP_iH$ | $CP_iL$ | $CP_{i-1}H$ | $CP_{i-1}L$ | $CP_{i-2}$--- | ---$SW_{i+1}$ | $SW_i$ | $SW_{i-1}$--- |
| ---X | L | X | H | X | X--- | --- 0 | 1 | 0 --- |
| ---X | X | H | X | L | X--- | --- 0 | 1 | 0 --- |
| ⋮ | ⋮ | ⋮ | ⋮ | ⋮ | ⋮ | ⋮ | ⋮ | ⋮ |

VOLTAGE BALANCER DEVICE FOR COMBINATION BATTERY

CROSS-REFERENCE TO RELATED APPLICATIONS

This application is based upon and claims benefit of priority of Japanese Patent Applications No. Hei-10-62577 filed on Mar. 13, 1998, and No. Hei-10-249841 filed on Sep. 3, 1998, the contents of which are incorporated herein by reference.

BACKGROUND OF THE INVENTION

1. Field of the Invention

The present invention relates to a device for eliminating or alleviating voltage unevenness among unit cells connected in series to form a combination battery. The unit cells are rechargeable battery cells such as lithium batteries, and the combination battery is used as an electric power source for driving an electric vehicle or a hybrid electric vehicle.

2. Description of Related Art

A vehicle powered by an electric power source such as a battery is recently becoming a hot subject form an ecology standpoint. However, a battery has not been sufficiently developed for economically and efficiently driving the vehicle. A hybrid electric vehicle (HEV) powered by both a battery and an engine is one of the solutions for compensating insufficiency of the battery. The HEV is driven by an engine when the engine operates in relatively high efficiency with less harmful exhaust emissions, while it is driven by the battery when the vehicle is starting and accelerating. Therefore, harmful exhaust emissions can be reduced with a help of battery having a relatively small capacity. An electric motor, a battery and other electric components have to be mounted on the HEV in addition to a conventional engine, and therefore the weight of the HEV tends to become much heavier than a conventional vehicle. Therefore, it is important to make the battery compact and efficient. For this purpose, a rechargeable lithium battery, in place of a conventional battery such as a lead-acid, nickel-cadmium or nickel-hydrogen battery, is attracting a keen interest. An energy density of the lithium battery is about four times of a lead-acid battery having a same capacity and about two times of a nickel-hydrogen battery. However, the rechargeable lithium battery is not robust against over-charge or over-discharge and has to be used within a predetermined voltage range to prevent excessive heating or dissolution of materials used therein. Therefore, the lithium battery is usually charged under a constant voltage or used together with a protection device for limiting a voltage range. In addition, many unit cells have to be connected in series to obtain a high voltage for driving a motor of the HEV. For example, 150 cells of the lead-acid battery each having 2 volts are connected in series for obtaining a terminal voltage of 300 volts, or 250 cells of the nickel-hydrogen battery are connected in series. In case of a lithium battery cell having 3.6 volts, 80 cells have to be connected in series. In a conventional combination battery using many cells connected in series, its terminal voltage is always detected, and it is charged and discharged based on the detected terminal voltage. For example, the terminal voltage is controlled between 270–360 volts in case of a lead-acid combination battery consisting of 150 cells each having 1.8–2.4 volts.

When the charging and discharging of a combination battery are controlled based on a total terminal voltage, there is a problem that voltage unevenness among individual cells cannot be avoided. That is, voltages of individual cells are not always equal to one another due to difference of individual cells or temperature difference. If the combination battery is charged up to a higher limit of the terminal voltage, some of the individual cells may be over-charged even an average voltage for all the cells is controlled within the voltage limit. If the combination battery is discharged up to a lower limit of the terminal voltage, some of the individual cells may be over-discharged. In case of the lead-acid, nickel-cadmium or nickel-hydrogen batteries, the combination battery is not heavily damaged even if over-charge or over-discharge of the individual cells occur, though its capacity or performance may be reduced somewhat. Therefore, such combination batteries are usually controlled based on the total terminal voltage.

However, in case of the lithium battery, such over-charge or over-discharge of the individual cells may be fatal. It should be definitely avoided. To cope with this problem, JP-A-2-136445, for example, proposes to detect an individual cell showing the highest voltage to stop charging before it exceeds a predetermined voltage, and to detect an individual cell showing the lowest voltage to terminate discharging before it falls below a predetermined voltage. According to the proposed control, all the cells constituting the combination battery can be protected from the over-charge or over-discharge. However, there is a disadvantage that total capacity of the combination battery is sacrificed because the charging is limited by the cell having the highest voltage and the discharging is limited by the cell having the lowest voltage.

Another solution to overcome the voltage unevenness is proposed in JP-A-6-253463, for example. In this proposal, a bypass circuit consisting of a resistance and a switch is connected to each cell in parallel. A cell having a higher voltage is discharged through the bypass circuit, or charging current is bypassed through the bypass circuit during a charging period. In this manner, voltage unevenness among individual cells is alleviated. Yet another solution is disclosed in JP-A-5-64377 and JP-A-8-213055. The degree of the charging in each cell is detected and the cell which has been fully charged is discharged through a bypass circuit, and all the cells are brought to a fully charged state in this manner. Thus, the voltage unevenness is eliminated.

However, to realize the control proposed by those disclosures, it is required to provide a complex and expensive control device as exemplified in FIG. 19. Discharge circuits 603, each consisting of a resistance 603a and a switch 603b, are connected to a combination battery 601 consisting of unit cells 602(1)–602(n) in parallel. Each switch 603b is controlled by a photo-coupler 610 (or an isolation amplifier) which in turn is controlled by a decoder 609. The voltage of each cell 602(1)–602(n) is detected by a voltage detector 604, and the detected voltage is fed to a multiplexer 605. The output of the multiplexer 605 is converted from an analog signal to a digital signal by an A/D converter 606. Then, the digital signal is processed by a microprocessor unit (MPU) 607 which communicates with a memory 608 and a controller for controlling vehicle operation. The MPU 607 controls the decoder 609. As shown in FIG. 19, a complex and expensive control system is necessary to realize the proposed voltage unevenness control. Especially, it has to be noted that a large number of components corresponding to the number of the unit cells are required in the system. Moreover, the MPU becomes expensive because it has to process many signals corresponding to each cell.

Another example of the voltage unevenness control device is disclosed in JP-A-8-55643, in which a comparator is used to compare the voltages of a pair of neighboring individual cells. One cell having a higher voltage than the other is discharged through a discharge circuit including a complementary transistors. A large number of control modules, each consisting of a voltage divider resistance, the comparator and the complementary transistors, are required in this device. If the number of unit cells constituting the combination battery is 80, 79 control modules are necessary. This makes the control device expensive. Moreover, since the voltage unevenness between a pair of neighboring cells is controlled by a control module, there is a problem that control errors among a number of modules may be accumulated and a precise control as a whole may not be attained.

SUMMARY OF THE INVENTION

The present invention has been made in view of the above-mentioned problems, and an object of the present invention is to provide a device for eliminating voltage unevenness among unit cells constituting a combination battery, and more particularly to provide such a device having a simple and inexpensive structure. Another object of the present invention is to provide a method of controlling the voltage unevenness among the unit cells to enhance durability of the combination battery.

According to the present invention, a large number of unit cells constituting a combination battery are divided into groups of unit cells, each group including several cells, preferably, 3–5 cells. A potential divider circuit having equal resistances connected in series to one another is connected in parallel to the group of cells. Each resistance corresponds to each cell in the group. The resistances in the voltage divider circuit equally divide the terminal voltage of the group of cells, thereby obtaining an average voltage among the cells. A comparator connected to each cell and each divider resistance compares the average voltage with an individual cell voltage. The cells having higher voltage than the average voltage are discharged through a discharge circuit which is closed or opened according to a signal fed from the comparator. The discharge circuit may be controlled by a switch triggered by signals from a logic circuit connected to the comparator, or by complementary transistors consisting of a PNP and a NPN transistor. The voltage divider circuit, the comparator and the discharge circuit constitute a voltage balancer device for the group of cells. Thus, the voltage of each cell in the group of cells is equalized.

A plurality of battery modules each including the group of cells and the voltage balancer device may be connected in series to form a combination battery. In this case, since the voltage unevenness among the cells in the battery module is eliminated by itself, only the voltage unevenness among the battery modules has to be eliminated. The voltage control among the battery modules may be performed by the conventional method using a smaller number of control components or in the same manner as in the battery module.

The group of cells may be connected through a switch to a voltage correction circuit having a capacitor. The cells having a higher voltage in the group are discharged by connecting the capacitor in parallel thereto, and the cells having a lower voltage are charged from the capacitor. This charging and discharging operation is alternately repeated, thereby making the cell voltages in the group equal. The group of cells is connected to the voltage correction circuit in an overlapped manner so that at least one cell in a group is commonly connected to other voltage correction circuits connected to neighboring groups. Thus, all the cell voltages in the combination battery are made equal. Several cells may be included in a group of cells, preferably, two or three cells.

Other objects and features of the present invention will become more readily apparent from a better understanding of the preferred embodiments described below with reference to the following drawings.

BRIEF DESCRIPTION OF THE DRAWINGS

FIG. 2 is a table showing truth values of a logic circuit used in the first embodiment;

FIG. 3 is a graph showing one example of terminal voltages of unit cells in the first embodiment;

FIG. 4 is a graph showing another example of terminal voltages of unit cells in the first embodiment;

FIG. 7 is a table showing truth values of a logic circuit used in the second embodiment;

FIG. 10 is a table showing truth values of logic circuit used in the voltage balancer device shown in FIG. 9;

DETAILED DESCRIPTION OF THE PREFERRED EMBODIMENTS (First Embodiment)

Figure 1:
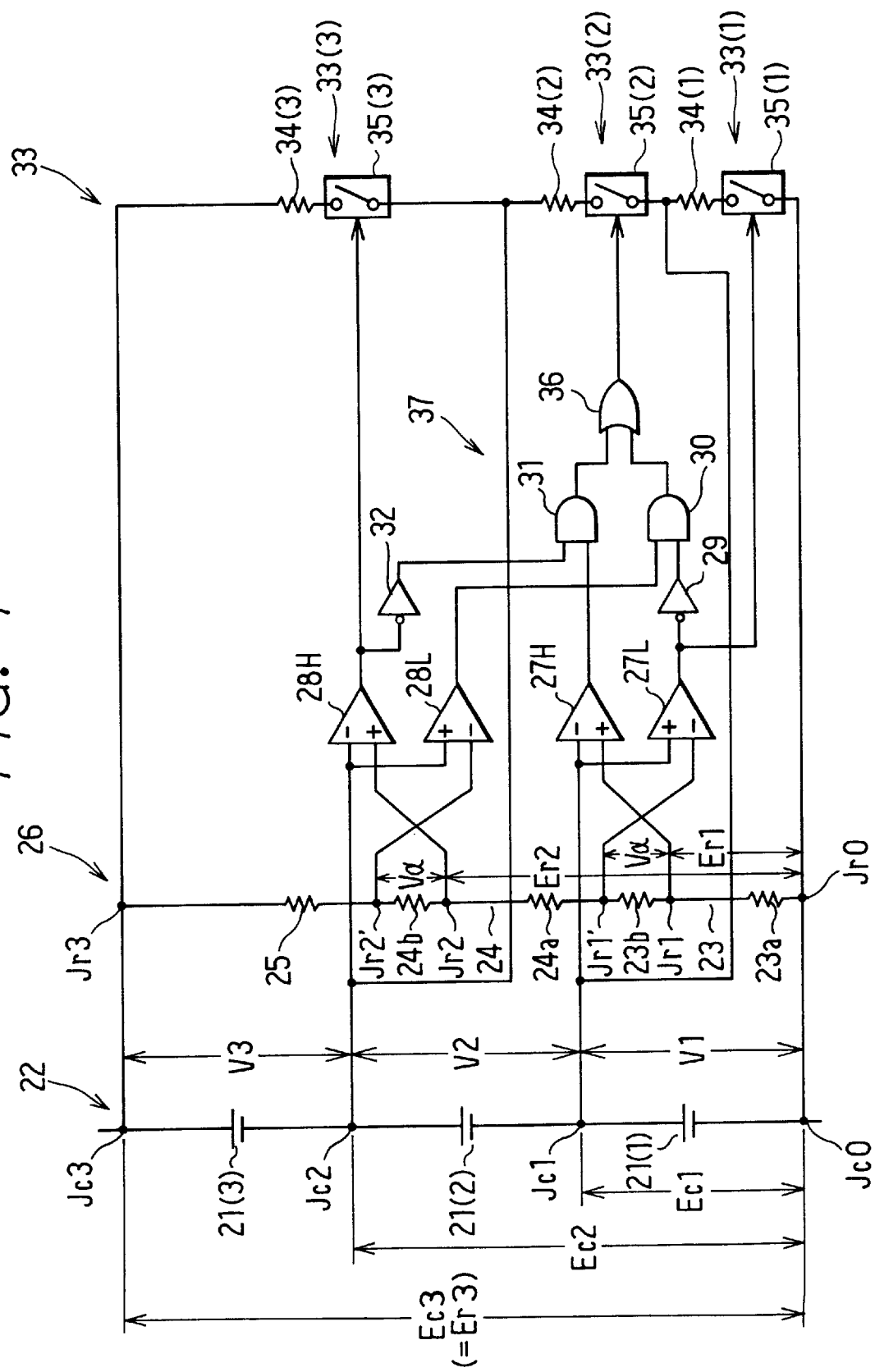
FIG. 1 is a circuit diagram showing a whole structure of a voltage balancer device as a first embodiment of the present invention.

A voltage balancer device as a first embodiment of the present invention will be described, referring to FIGS. 1–5. The first embodiment is to control a cell group 22 which includes three unit cells 21(1), 21(2) and 21(3). Three unit cells which are rechargeable lithium batteries are connected in series. A potential divider circuit 26 including three resistances 23, 24 and 25 is connected to the cell group 22 in parallel. The resistance 23 is composed of a high resistance 23a and a low resistance 23b, and the resistance 24 is composed of a high resistance 24a and a low resistance 24b. The value of resistances 23a, 24a, 25 is all the same, and the value of resistances 23b, 24b is negligibly small compared with that of resistances 23a, 24a, 25, for example, 1/4000. Therefore, the total voltage of the cell group 22 is substantially equally divided into three by the resistances 23, 24, 25. Junctions connecting three cells in series are denoted by Jc0, Jc1, Jc2 and Jc3 from the bottom as shown in FIG. 1. Junctions in the potential divider circuit 26 are denoted by Jr0, Jr1, Jr1', Jr2, Jr2' and Jr3 from the bottom as shown in FIG. 1.

Four comparators 27L, 27H, 28L, 28H, two inverter gates 29, 32, two AND gates 30, 31, and an OR gate 36 are connected to the cell group 22 and the potential divider circuit 26, as shown in FIG. 1. A discharge circuit 33 having three discharge circuits 33(1), 33(2), 33(3), connected to one another in series, is connected to the cell group 22 in parallel as shown in FIG. 1. The discharge circuit 33(1) includes a switch 35(1) and a discharge resistance 34(1). Similarly, the discharge circuit 33(2) includes a switch 35(2) and a discharge resistance 34(2), and the discharge circuit 33(3) includes a switch 35(3) and a discharge resistance 34(3).

An inverse input terminal of the comparator 27H and a non-inverse input terminal of the comparator 27L are commonly connected to the junction Jc1. A non-inverse input terminal of the comparator 27H is connected to the junction Jr1, and an inverse input terminal of the comparator 27L is connected to the junction Jr1'. Similarly, the comparators 28L and 28H are connected to the junctions Jc2, Jr2 and Jr2'. An output terminal of the comparator 27L is connected to one input terminal of the AND gate 30 through the inverter gate 29, and an output terminal of the comparator 27H is connected to one input terminal of the AND gate 31. An output terminal of the comparator 28L is connected to the other input terminal of the AND gate 30, and an output terminal of the comparator 28H is connected to the other terminal of the AND gate 31 through the inverter gate 32.

A junction of discharge circuits 33(1) and 33(2) is connected to the junction Jc1, and a junction of discharge circuits 33(2) and 33(3) is connected to the junction Jc2. The switches 35(1), 35(2), 35(3) are composed of transistors or FETs which close when a high level signal (H) is applied to their control terminals. The control terminal of the switch 35(1) is connected to the output terminal of the comparator 27L, and the control terminal of the switch 35(3) is connected to the output terminal of the comparator 28H. The control terminal of the switch 35(2) is connected to the output terminal of the OR gate 36. Two input terminals of the OR gate 36 are connected to the output terminals of the AND gates 30, and 31, respectively. The inverter gates 29, 32, the AND gates 30, 31 and the OR gate 36 constitute a logic circuit 37. The power for driving the comparators 27L, 27H, 28L, 28H and the logic circuit 37 is supplied from the cell group 22.

Operation of the voltage balancer device shown in FIG. 1 will be described in reference to FIGS. 2, 3 and 4. V1, V2 and V3 shown in FIG. 1 denote respective terminal voltages of unit cells 21(1), 21(2) and 21(3). Potentials of the junctions Jc1, Jc2 and Jc3 measured from the junction Jc0 are denoted by Ec1, Ec2 and Ec3, respectively. Potentials of the junctions Jr1, Jr2 and Jr3 measured from the junction Jr0 are denoted by Er1, Er2 and Er3, respectively. The potentials Ec1, Ec2 and Ec3 are expressed by the following formulae:

$Ec1=V1$ $Ec2=V1+V2$ $Ec3=V1+V2+V3=Er3$

Since the resistances 23a, 24a, 25 are all the same and the resistances 23b, 24b are negligibly low, a same voltage which is an average of V1, V2 and V3 is applied to both ends of the respective resistances 23a, 24a, 25. Therefore, the potentials Er1, Er2 and Er3 are expressed by the following formulae:

$Er1=(1/3)\cdot Ec3=(1/3)\cdot(V1+V2+V3)$ $Er2=(2/3)\cdot Ec3=(2/3)\cdot(V1+V2+V3)$ $Er3=(3/3)\cdot Ec3=V1+V2+V3$ Conditions under which the outputs from the comparators 27H, 27L, 28H, 28L become a high level (H) are as follows:

Comparator 27H: Er1>Ec1

Comparator 27L: Er1+Vα<Ec1→Er1<Ec1−Vα

Comparator 28H: Er2>Ec2

Comparator 28L: Er2+Vα<Ec2→Er2<Ec2−V60, where Vα is a voltage across the resistance 23b, 24b. Since the resistances 23b and 24b are very low, the voltage Vα is very small. The above formulae mean that the comparator 27H becomes a high level when the divided potential Er1 is higher than the cell potential Ec1. The comparator 27L becomes a high level when the divided potential Er1 is lower than the cell potential Ec1 minus a very small value Vα. Therefore, both comparators 27H and 27L become a low level, when the divided potential Er1 is in the range: Ec1−Vα≦Er1≦Ec1, namely, when Er1 is substantially equal to Ec1. The comparators 28H and 28L operate similarly.

FIG. 2 shows conditions under which the respective switches 35(1), 35(2), 35(3) are turned on. "H" means a high level, "L" a low level and "X" an arbitrary level. "1" indicates turning-on of the respective switches and "0" indicates turning-off thereof. When the respective unit cell voltages V1, V2, V3 are not equal, unit cells having a higher voltage are discharged by alternately closing switches 35(1), 35(2), 35(3), and the voltage unevenness among the unit cells is eliminated. The discharge process will be described below, taking some cell voltage conditions as examples.

When the initial condition of the unit cells is: V3>V2>V1, the respective cell voltages are equalized as shown in FIG. 3. First, the process during a period A shown in FIG. 3 will be described. In this period, the divided potential Er1, which is an average voltage Vav=1/3·(V1+V2+V3), is higher than the cell potential Ec1. That is, Er1=Vav>Ec1. The divided potential Er2, which is (2/3)·Vav, is higher than the cell potential Ec2. That is, Er2>Ec2. Therefore, both comparators 27H and 28H become a high level (H), and accordingly the switch 35(3) closes as shown in FIG. 2. As a result, the unit cell 21(3) is discharged. As the unit cell 21(3) is discharged, the voltage V3 decreases and becomes lower than V2 as shown in FIG. 3. By discharging the unit cell 21(3), the divided potential Er2 is also lowered. When the divided potential Er2 becomes equal to the cell potential Ec2 (Er2=Ec2), the comparator 28H becomes a low level (L). At this moment the unit cell voltage V3 is equal to the average voltage Vav (V3=Vav) as shown at time P in FIG. 3. V2 is still higher than V1 (V2>V1) at this moment because the unit cell 21(2) is not yet discharged, and accordingly Er1 is still higher than Ec1 (Er1>Ec1). Therefore, the comparator 27H continues to be H. Thus, the condition where the comparator 28H is L and the comparator 27H is H exists, and accordingly the switch 35(2) is turned on and the switch 35(3) is turned off as shown in FIG. 2.

Secondly, the discharge process during a period B will be described below. As V2 decreases by discharging the unit cell 21(2), the cell potential Ec2 decreases, and the divided potential Er2 becomes higher than the cell potential Ec2 (Er2>Ec2). Accordingly, the comparator 28H becomes H again, and the switch 35(3) is turned on while the switch 35(2) is turned off. As a result, the unit cell 21(3) is again discharged while the discharging of the unit cell 21(2) is stopped. Accordingly, V3 decreases and becomes equal to Vav again, and the divided potential Er2 becomes equal to the cell potential Ec2 (Er2=Ec2), bringing the comparator 28H to L. The comparator 27H still remains at H at this time, because the unit cell 21(2) is not discharged and the divided potential Er1 is still higher than the cell potential Ec1 (Er1>Ec1). Therefore, the switch 35(2) is turned on while the switch 35(3) is turned off. In this manner, the switches 35(2) and 35(3) are alternately turned on and the unit cells 21(2) and 21(3) are alternately discharged in the period B. Though FIG. 3 shows that the cell voltages V2 and V3 decrease linearly, either voltage V2 or V3 stays unchanged when the other voltage is decreasing if the process is observed in detail. Such a process is repeated with a high frequency. When all the cell voltages V1, V2, V3 are finally equalized, all the comparators 27H, 27L, 28H, 28L become L, and the discharge process is completed and the voltage unevenness among the unit cells is eliminated.

When the initial condition of the cell voltages is: V1>V2>V3, the respective cell voltages are equalized in a similar manner as in the foregoing process. In the graph of FIG. 3, V1 and V3 have to be exchanged. Under this initial condition, the divided potential Er1 is lower than the cell potential Ec1, and the divided potential Er2 is lower than the cell potential Ec2. Therefore, both comparators 27L and 28L are H, and accordingly the switch 35(1) is turned on, discharging the unit cell 21(1). As the cell voltage V1 decreases in accordance with its discharge to the level of the divided potential Er1 (V1=Ec1=Er1), the comparator 27L becomes L. As a result, the switch 35(2) is turned on and the switch 35(1) is turned off, thereby discharging the unit cell 21(2) and terminating the discharge from the unit cell 21(1). As V2 drops by the discharge of the unit cell 21(2), the divided potential Er1 becomes lower than the cell potential Ec1 (Er1<Ec1) because the unit cell 21(1) is not discharged in this period. As a result, the comparator 27L becomes H again, terminating the discharge from the unit cell 21(2) and starting the discharge from the unit cell 21(1). As V1 drops according to the discharge from the unit cell 21(1), the divided potential Er1 becomes again equal to the cell potential Ec1 (Er1=Ec1). As a result, the discharge from the unit cell 21(1) is terminated and the discharge from the unit cell 21(2) begins. In this manner, the switches 35(1) and 35(2) are alternately turned on and the unit cells 21(1) and 21(2) are alternately discharged. When the cell voltages are all balanced (V1=V2=V3), the voltage balancing process is completed.

When the initial condition of the cell voltages is: V2>V3=V1, the cell voltage V2 is adjusted as shown in FIG. 4. Under this condition, the divided potential Er1 is higher than the cell potential Ec1 (Er1>Ec1), and the divided potential Er2 is lower than the cell potential Ec2 (Er2<Ec2). Therefore, both comparators 27H and 28L become H. At this moment, both comparators 27L and 28H are L. Accordingly, the switch 35(2) is turned on, discharging the unit cell 21(2). As the cell voltage V2 drops according to the discharge from the unit cell 21(2), the divided potential Er1 is lowered until it becomes equal to the cell potential Ec1 (Er1=Ec1), and the cell potential Ec2 is also lowered until it becomes equal to the divided potential Er2 (Ec2=Er2). When all the cell voltages are balanced (V1=V2=V3), the process is completed.

The operation of the first embodiment described above is summarized as follows. The total terminal voltage of the cell group 22 is divided by the potential divider circuit 26. The divided potentials Er1 (=Vav), Er2 (=2Vav) and Er3 (=3Vav) are compared with the cell potentials Ec1 (V1), Ec2(=V1+V2) and Ec3 (=V1+V2+V3), respectively, under the operation of the comparators 27H, 27L, 28H and 28L. Then, any cell having a cell voltage higher than the average voltage Vav is automatically discharged, under the operation of the logic circuit 37, through the respective discharge circuit connected in parallel to the unit cell. More particularly, taking the unit cell 21(2) as an example, if it is determined that the cell voltage V2 is higher than the average voltage Vav, the unit cell 21(2) is discharged, when either one of the following conditions exists:

$Ec2 \geq Er2$, and $Ec1 < Er1$, or $Ec2 > Er2$, and $Ec1 \leq Er1$

Thus, the voltage unevenness among the unit cells, which is caused by an uneven state of charge (SOC), is automatically eliminated, thereby avoiding the over-charge or over-discharge of the unit cells. It is particularly advantageous if this invention is applied to the lithium battery cells having a high energy density and requiring a stricter voltage control. Moreover, in this embodiment, an electric power for operating the comparators and the logic circuit is supplied from the combination battery 22 without using a separate power source, as opposed to conventional devices in which a separate power source supplying a stable operating voltage to microprocessor units is necessary. In addition, the terminal voltage of the group of three cells which is about 10.8 volts (3.6 volts×3) is adequate to operate the comparators and the logic circuit. Also, the power required for controlling the cell voltage is much smaller than that of a device using microprocessor units.

Figure 5:
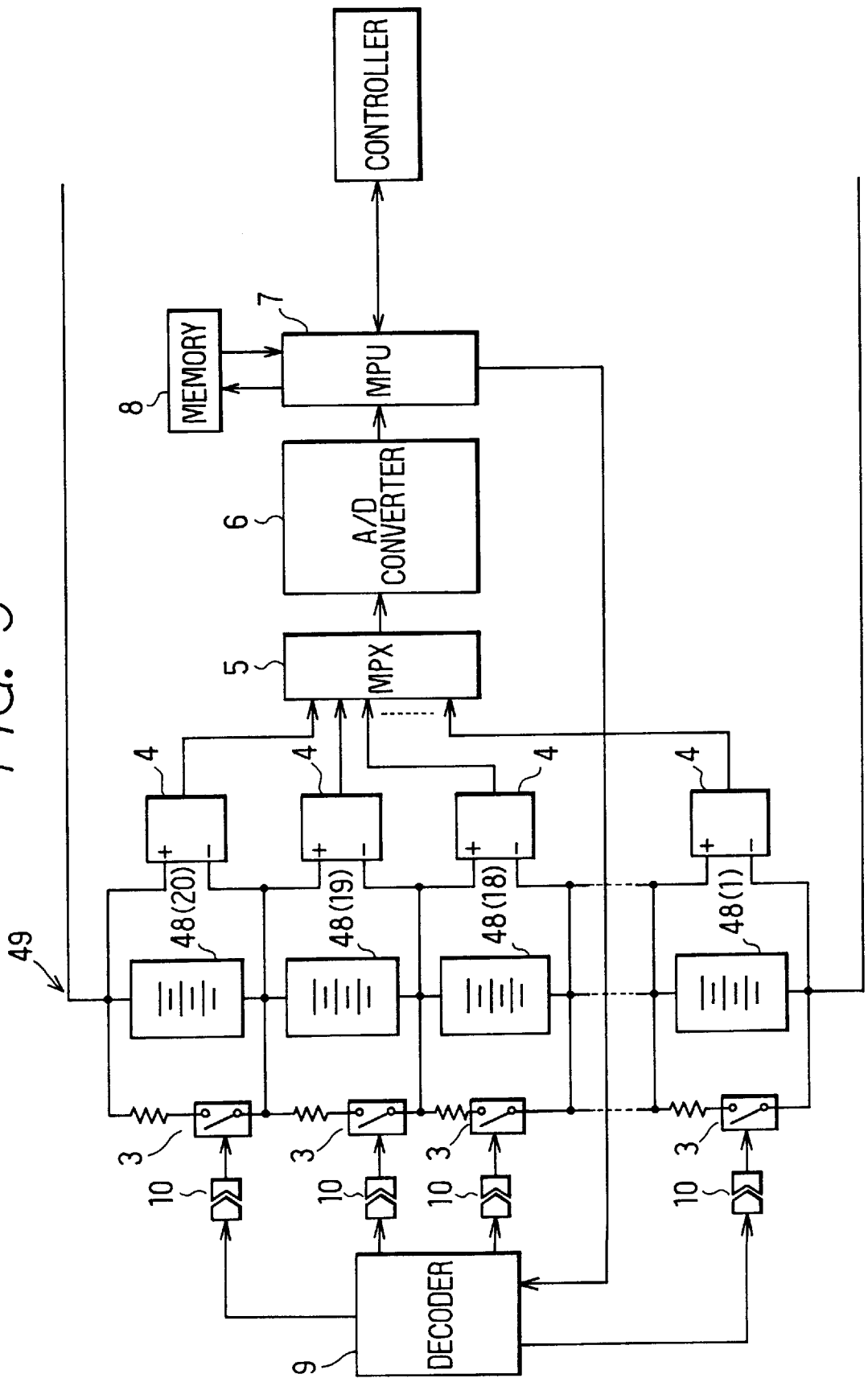
FIG. 5 is a block diagram showing a whole control device including a plurality of voltage balancer devices shown in FIG. 1.

The above-described device which includes the cell group 22 consisting of three unit cells connected in series, the potential divider circuit 26, four comparators, the logic circuit 37 and the discharge circuit 33 may be regarded as a single battery module 48. As shown in FIG. 5, a plurality of the battery modules 48(1)–48(20), e.g., 20 modules, are connected in series to constitute a combination battery 49 for use in a hybrid electric vehicle. The total terminal voltage of the combination battery 49 is 216 volts because 20 battery modules, each having 10.8 volts, are connected in series. A discharge circuit 3 is connected in parallel to each battery module 48(1)–48(20). The discharge circuit 3 is opened or closed according to a signal from a decoder 9 through a photo-coupler 10. The terminal voltage of the battery module 48 is detected by a voltage detector 4 which feeds its output to a multiplexer 5. The output from the multiplexer 5 is fed to an A–D converter 6 which in turn supplies its output to a microprocessor unit 7. The microprocessor unit 7 communicates with a memory 8 and an engine controller. The decoder 9 is controlled by the microprocessor unit 7.

Since the voltage unevenness among the cells in a battery module 48 is controlled by itself, the terminal voltage unevenness among the battery modules 48 is controlled by discharging the battery modules which have a module voltage higher than an average voltage. The module voltage is periodically detected by the voltage detector 4 and controlled under operation of the microprocessor unit 7. In this device, only one microprocessor unit 7 is necessary to control the voltage unevenness among all of the unit cells (60 unit cells in this particular embodiment), as opposed to a conventional device which uses plural microprocessor units. Therefore, a whole voltage balancer device can be made at a low cost according to the present invention, while attaining a precise voltage control.

(Second Embodiment)

Figure 6:
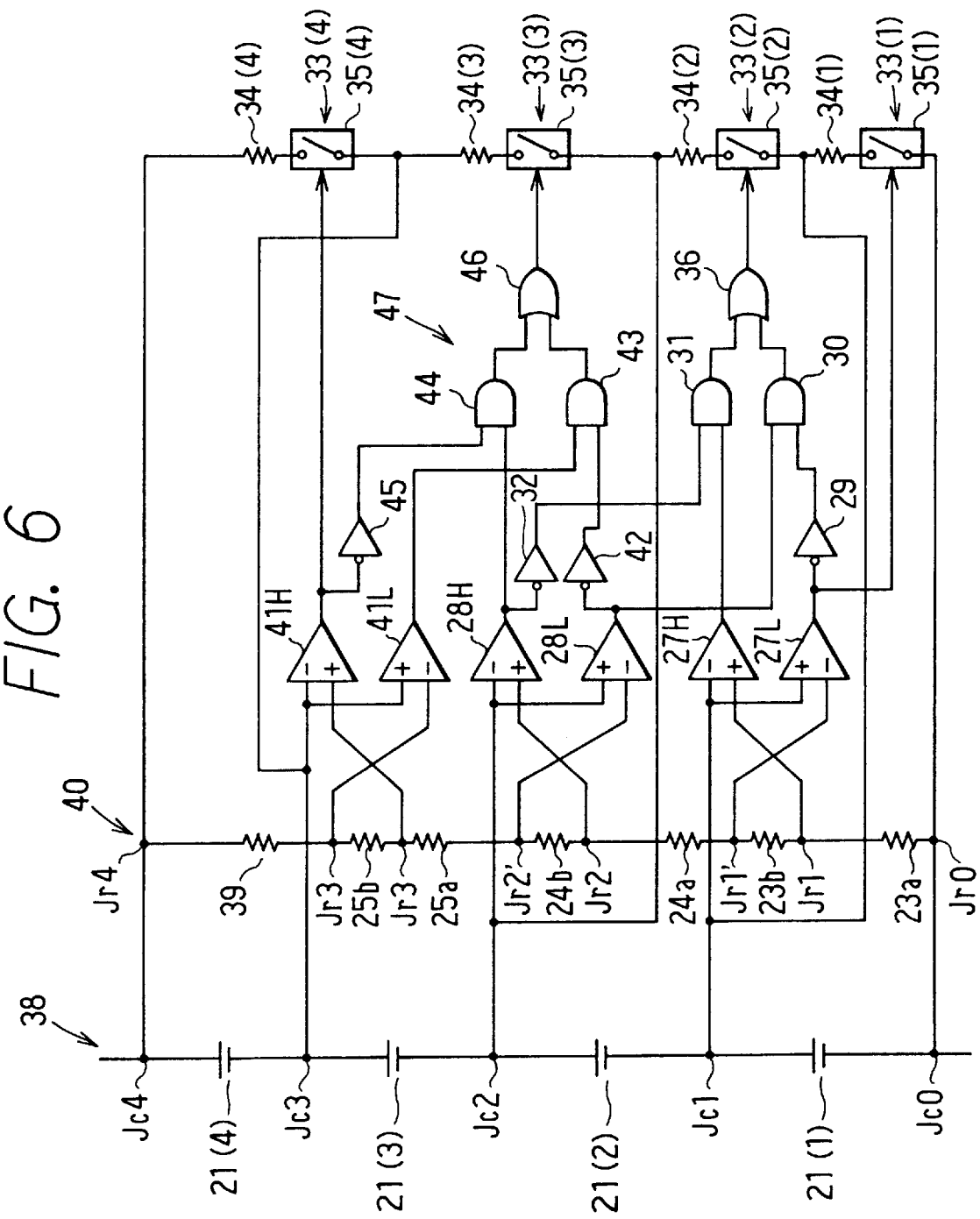
FIG. 6 is a circuit diagram showing a voltage balancer device as a second embodiment of the present invention.

Referring to FIGS. 6 and 7, a second embodiment of the present invention will be described. The second embodiment is similar to the first embodiment except that a cell group 38 consists of four unit cells 21(1)–21(4) instead of three, two comparators 41H and 41L are added and a logic circuit 47 is somewhat modified. Since most of the components and operation thereof are the same as those of the first embodiment, only the difference of the second embodiment from the first embodiment will be explained. The components which are the same as those of the first embodiments are denoted with the same numbers. As shown in FIG. 6, one more unit cell 21(4) is added to the cell group 22 of the first embodiment. A high resistance 25a and a low resistance 25b are added to a voltage divider circuit 40. Comparators 41H and 41L are additionally used, and a logic circuit 47 is constituted by four inverters 29, 42, 32, 45, four AND gates 30, 31, 43, 44 and two OR gates 36, 46. A discharge circuit 33(4) consisting of a switch 35(4) and a discharge resistance 34(4) is added to the discharge circuit 33. Those components are connected as shown in FIG. 6 in the similar manner as in the first embodiment. The operating power is supplied from the cell group 38 to comparators and the logic circuit.

Conditions, under which the respective switches 35(1)–35(4) are closed, are shown in the truth value table in FIG. 7. The truth values shown in the fourth, fifth and sixth lines are determined by the logic of comparators 27L, 27H, 28L, 28H in the same manner as in the first embodiment. The conditions in seventh line for turning off all the switches 35(1)–35(4) exists when all the comparators become L. The condition in the second and third lines for turning on the switch 35(3) are led by applying the same logic in the first embodiment to the comparators 28L, 28H, 41L and 41H. The condition in the first line for turning on the switch 35(4) exists when the comparator 41H becomes H. In other words, the condition for turning on the switch 35(1) is determined solely by the logic of the comparator 27L which becomes H when a potential at the junction Jc1 is higher than a potential at the junction Jr1. The condition for turning on the switch 35(4) is determined solely by the logic of the comparator 41H which becomes H when a potential at the junction Jr3 is higher than a potential at the junction Jc3. The condition for turning on the switch 35(2), for example, located between the switches 35(1) and 35(4), is determined by the logic of comparators 28H, 28L, 27H and 27L.

The second embodiment above-described for eliminating the voltage unevenness among four unit cells can be used as the battery module 48 shown in FIG. 5 in the same manner as in the first embodiment. In this case, if 20 modules are connected in series, the total terminal voltage of the combination battery 49 is about 300 volts (3.6 volts×4×20).

Figure 8:
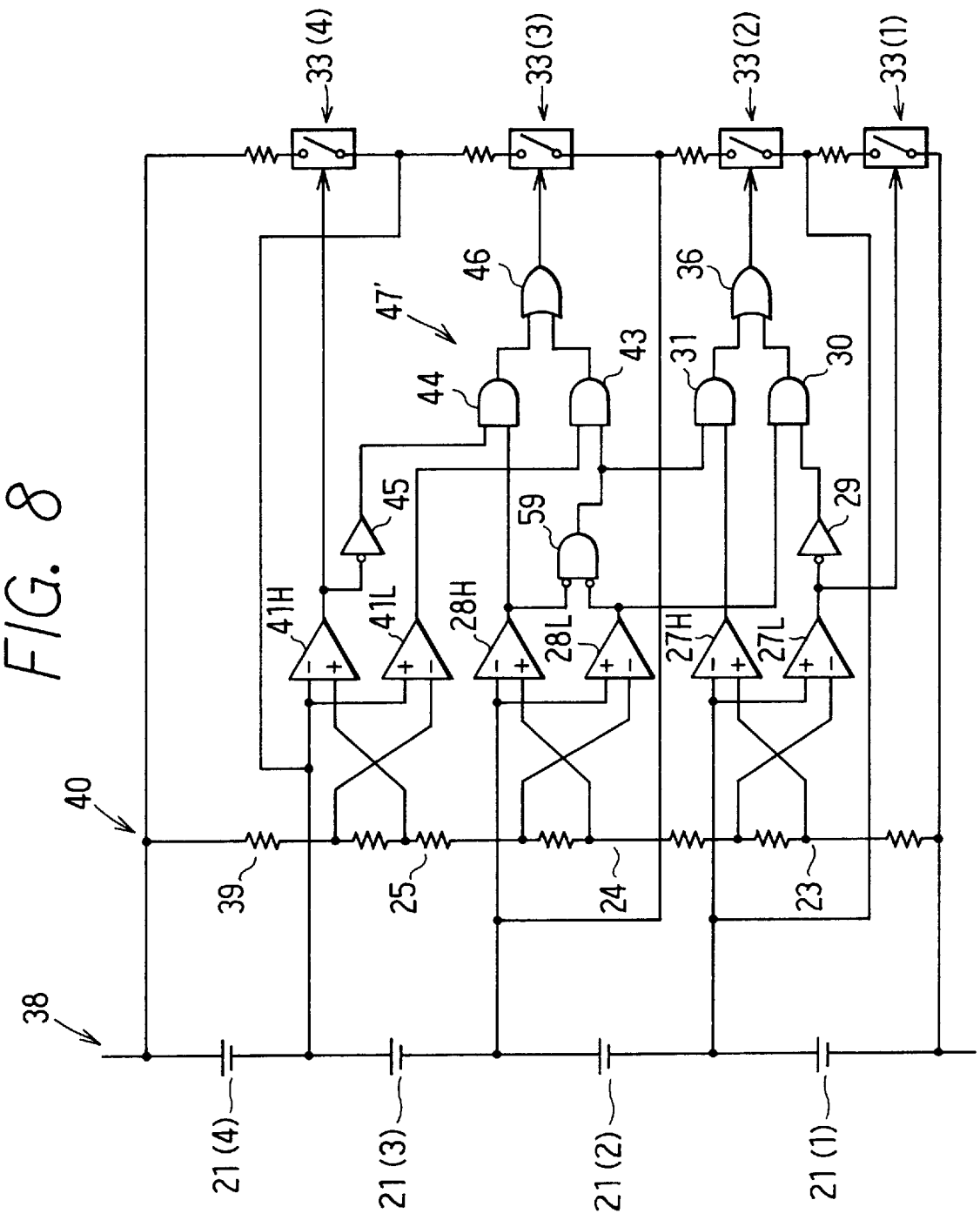
FIG. 8 is a circuit diagram showing a modified form of the second embodiment.

The second embodiment shown in FIG. 6 may be modified in a form shown in FIG. 8. The inverters 32, 42 in FIG. 6 are replaced by an inverted AND gate 59. The output of the inverted AND gate 59 is commonly connected to input terminals of the AND gates 31 and 43. In this case, it is determined that the cell voltage V2 is higher than the average cell voltage Vav, when the cell potential Ec2 is substantially equal to the divided potential Er2 (Ec2=Er2) and the cell potential Ec1 is lower than the divided potential Er1 (Ec1<Er1). Also, it is determined that the cell voltage V3 is higher than the average cell voltage, when the cell potential Ec2 is substantially equal to the divided potential Er2 (Ec2=Er2) and the cell potential Ec3 is higher than the divided potential Er3 (Ec3>Er3).

Figure 9:
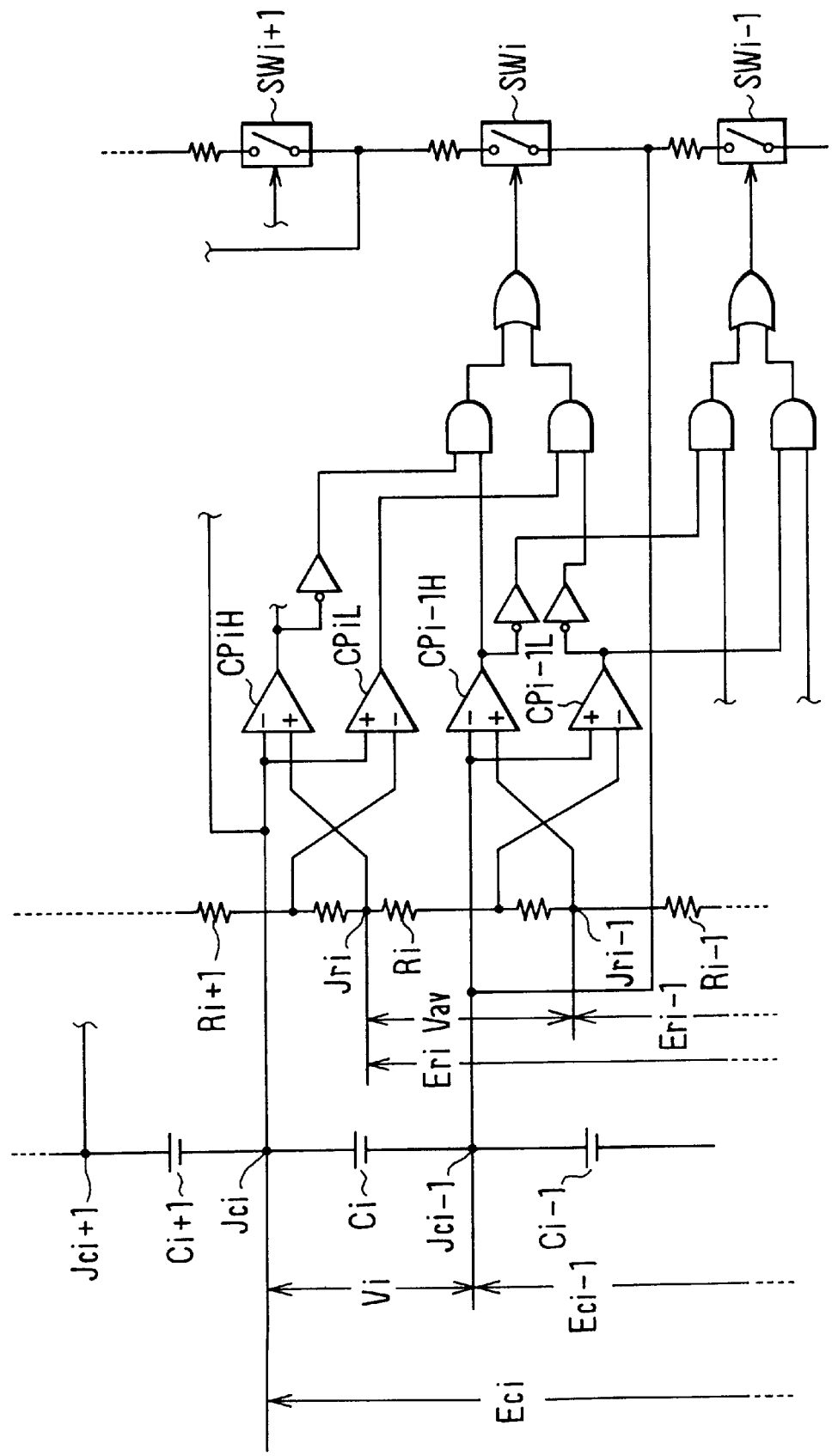
FIG. 9 is a circuit diagram showing a voltage balancer device applied to a cell group which includes n cells.

The number of the unit cells included in one cell group may be chosen arbitrarily, through it is preferable to use three to five unit cells, in case a lithium battery having 3.6 volts is used as the unit cell. FIG. 9 shows a block diagram of a voltage balancer device in which n unit cells are included in one group of cells. FIG. 10 shows conditions under which respective switch circuits are closed. Referring to FIG. 9, unit cells Ci (i=1 to n) are connected in series, forming a cell group. A voltage divider circuit having resistances Ri (i=1 to n) connected in series is connected in parallel to the cell group. A pair of comparators CPiH and CPiL are operably connected to a corresponding unit cell Ci and divider resistance Ri. A logic circuit including inverters, AND gates and OR gates are connected to the comparators as shown in FIG. 9. Vi denotes, in the same manner as in the first and second embodiments, the cell voltage, Eci the cell potential, Eri the divided potential, Jci the cell junction, Jri the divider resistance junction, Swi the discharge switch, and Vav the average unit cell voltage. The comparator CPiH becomes a high level (H) when the divided potential Eri is higher than the cell potential Eci (Eri>Eci). The comparator CPiL becomes H when the cell potential Eci is higher than the divided potential Eri (Eci>Eri).

Since there are following relations: vi=Eci−Eci−1, and Vav=Eri−Eri−1, the condition for determining that the cell voltage Vi is higher than the average cell voltage Vav (Vi>Vav), namely, the condition for turning on the discharge switch Swi is:

$Eci \geq Eri$, and $Eci-1 < Eri-1$, or $Eci > Eri$, and $Eci-1 \leq Eri-1$

Conditions for turning on the respective switches Swi are shown in FIG. 10. Taking the first line in FIG. 10 as an example, the fact that at least the comparator CPi-IH is H corresponds to the condition (Eci−1<Eri−1). The fact that at least the comparator CPiH is L corresponds to the condition (Eci≧Eri), because this condition is a negation of the condition (Eci<Eri). The condition for bringing both compartators CPiH and CPiL to L corresponds to the condition (Eci=Eri).

When the number of unit cells is 10 (n=10), for example, the first unit cell C1 is discharged by turning on the switch Sw1 if the comparator CP1L is H, and the tenth unit cell C10 is discharged by turning on the switch Sw10 if the comparator CP10H is H. As to unit cells C2–C9, they are discharged by turning on the respective switches when the condition for turning on the respective discharge switch exists.

The modification of the second embodiment shown in FIG. 8 may be applied also to the voltage balancer device shown in FIG. 9.

(Third Embodiment)

Figure 11:
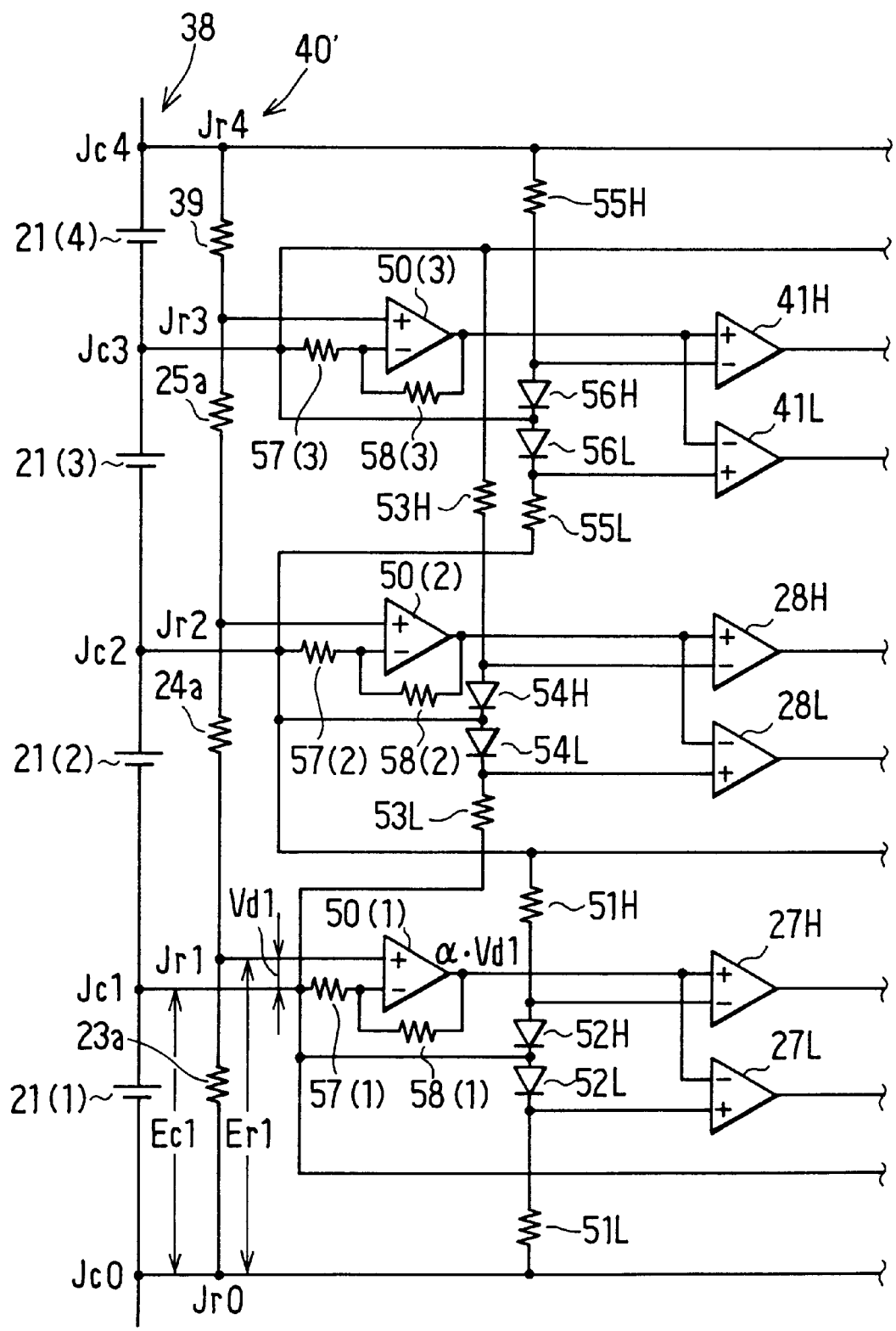
FIG. 11 is a circuit diagram showing a voltage balancer device as a third embodiment of the present invention.

Referring to FIG. 11, a third embodiment of the present invention will be described. In this embodiment, the voltage divider circuit 40 of FIG. 6 is modified into a voltage divider circuit 40' shown in FIG. 11. The low resistances 23b, 24b, 25b used in the voltage divider circuit 40 are eliminated, and in their place, differential amplifiers 50(1), 50(2), 50(3), diodes and associated resistances 51L–56H are added. Inverted and non-inverted terminals of the differential amplifier 50(1) are connected to the junctions Jc1 and Jr1, respectively. An output terminal of the differential amplifier 50(1) is connected to the non-inverted terminal of the comparator 27H and the inverted terminal of the comparator 27L. Resistances 57(1) and 58(1) connected to the differential amplifier 50(1) determine an amplification factor α. A resistance 51H, diodes 52H, 52L and a resistance 51L is connected in series between the junctions Jc2 and Jc0. A junction point of the diodes 52H and 52L is connected to the junction Jc1. The inverted input terminal of the comparator 27H is connected to an anode of the diode 52H, and the noninverted terminal of the comparator 27L is connected to a cathode of the diode 52L. Similarly, the differential amplifiers 50(2) is disposed between the junctions Jc2, Jr2 and the comparators 28H, 28L, and the differential amplifier 50(3) is disposed between the junctions Jc3, Jr3 and the comparators 41H, 41L. A series circuit of a resistance 53H, diodes 54H, 54L and a resistance 53L is connected between the junctions Jc3 and Jc1. A series circuit of a resistance 55H, diodes 56H, 56L and a resistance 55L is connected between the junctions Jc4 and Jc2. Other structures are the same as those of the second embodiment shown in FIG. 6.

The voltage balancer device as the third embodiment operates as follows. The differential amplifier 50(1) amplifies a potential difference Vd1 (=Er1−Ec1) and feeds the amplified signal α·Vd1 to the comparators 27H and 27L. The comparator 27H becomes H when the signal α·Vd1 is higher than a forward voltage Vf of the diode 52H (α·Vd1>Vf). The comparator 27L becomes H when the signal α·Vd1 is negative (that is, Er1<Ec1) and its absolute value is higher than a forward voltage Vf of the diode 52L (|α·Vd1|>Vf). The differential amplifiers 50(2), 50(3) operate similarly.

In the third embodiment, the potential difference Vdi (Eri−Eci) is amplified by the differential amplifier 50(i), and the amplified signal α·Vdi is fed to the comparators. The level of α·Vdi is compared with the forward voltage Vf which is stable against ambient temperature change. Therefore, comparison of the levels between the unit cell voltage Vi and the average unit cell voltage Vav is performed precisely without being affected by ambient temperature change. In other words, the third embodiment is more robust against ambient temperature change than the second embodiment in which the low resistances 23b, 24b, 25b are used.

(Fourth Embodiment)

Figure 12:
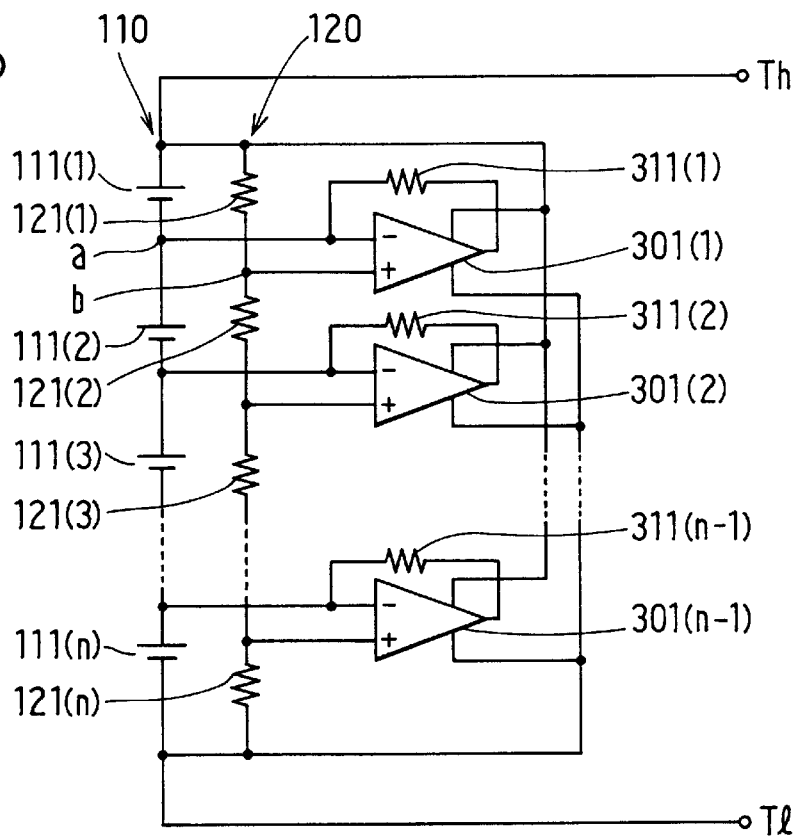
FIG. 12 is a circuit diagram showing a voltage balancer device as a fourth embodiment of the present invention.
Figure 13:
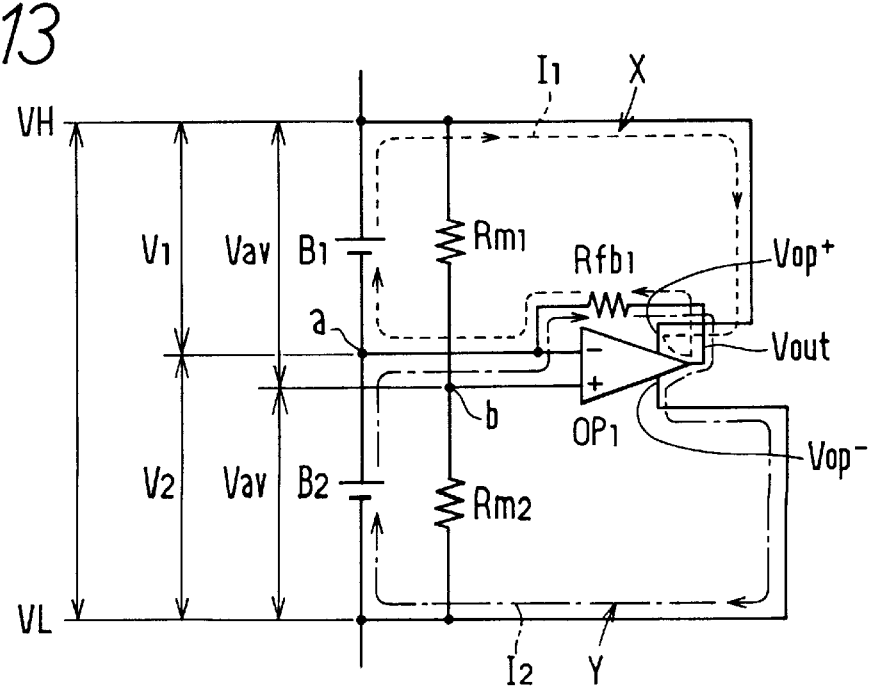
FIG. 13 is a circuit diagram for explaining operation of the fourth embodiment.

Referring to FIGS. 12 and 13, a fourth embodiment of the present invention will be described. A combination battery 110 is composed of n unit cells 111(1)–111(n) connected in series to one another. The unit cell 111(i) may be a single cell such as a rechargeable lithium battery cell or any combination of plural cells. The following description will be made, assuming that the unit cell is a single cell for simplicity. A voltage divider circuit 120 consisting of n resistances 121(1)–121(n), each having a same resistance value and connected in series to one another, is connected in parallel to both terminals of the combination battery 110. Operation amplifiers 301(1)–301(n−1) are connected to the combination battery 110 and the voltage divider circuit 120 as shown in FIG. 12. As to the operation amplifier 301(1), for example, its inverted input terminal is connected to a junction "a" which is a junction of the unit cells 111(1) and 111(2), and its non-inverted input terminal is connected to a junction "b" which is a junction of the divider resistances 121(1) and 121(2). Other operation amplifiers are connected in the same manner. A feedback resistance 311(1) is connected between the inverted input terminal and an output terminal of the operation amplifier 301(1). Other feedback resistances 311(2)–311(n−1) are connected in the same manner. Voltage for driving the operation amplifiers 301(i) is supplied from the combination battery 110. A high voltage terminal Th and a low voltage terminal Tl of the combination battery 110 are connected to a load such as a driving motor of an electric vehicle and to a device for charging the combination battery 110.

Operation principle of the fourth embodiment shown in FIG. 12 will be explained, referring to a circuit model shown in FIG. 13. In the circuit model, two battery cells B1 and B2 are connected in series, constituting a combination battery. A voltage divider circuit having divider resistances Rm1 and Rm2 is connected in parallel to the combination battery. Both resistances Rm1 and Rm2 have a same value of resistance. An inverted input terminal of an operation amplifier OP1 is connected to a junction "a" which is a junction of the two cells B1 and B2, and a non-inverted input terminal is connected to a junction "b" which is a junction of two divider resistances Rm1 and Rm2. A feedback resistance Rfb1 is connected between an output terminal Vout of the operation amplifier OP1 and the inverted input terminal thereof. A positive terminal Vop+ of the operation amplifier OP1 is connected to a high voltage terminal VH of the combination battery, and a negative terminal Vop− is connected to a low voltage terminal VL. Power for driving the operation amplifier OP1 is supplied from the combination battery.

Assuming that the unit cell B1 has a cell voltage V1, the unit cell B2 has a cell voltage V2, and the potential of the low voltage terminal VL is zero (0), then the potential of VH is V1+V2. Since the potential VH is equally divided by the divider resistances Rm1 and Rm2, an average cell voltage Vav is VH/2=(V1+V2)/2. If V2 is higher than V1 (V1<Vav<V2), the output Vout of the operation amplifier becomes equal to VL (=0). At this moment, the voltage V2 is applied across the feedback resistance Rfb1, and current I2 flows through a circuit Y shown with a chained line (B2+→Rfb1→Vout→Vop→B2−). The amount of I2 is substantially equal to V2/Rfb1. This means that the battery B2 is discharged while the battery B1 is not discharged. Therefore, V2 decreases until it becomes equal to the average voltage Vav (V2=Vav). After V2 becomes equal to Vav, no discharge current flows because a voltage difference between the inverted input terminal and the non-inverted terminal of the operation amplifier OP1 disappears.

Under another situation where V1 is higher than V2 (V1>Vav>V2), the output Vout of the operation amplifier OP1 becomes substantially equal to VH (Vout=VH=V1+V2) because a voltage applied to the inverted input terminal of the operation amplifier OP1 is lower than a voltage applied to the non-inverted terminal. The voltage V1 is applied across the feedback resistance Rfb1, and current I1 flows through a circuit X shown with a dotted line (B1+→Vop+ →Vout→Rfb1→B1−). Therefore, V1 decreases until it becomes equal to the average voltage Vav (V1=Vav). After V1 becomes equal to Vav, no discharge current flows because a voltage difference between the inverted input terminal and the non-inverted terminal of the operation amplifier OP1 disappears. As a result, voltages of both battery cells are balanced.

The same principle explained above is applied to the voltage balancer device shown in FIG. 12. That is, the cell potential Pai at point "ai" (i-th junction in the combination battery) is compared with the divided potential Pbi at point "bi" (i-th junction in the voltage divider circuit). If Pai is higher than Pbi, lower level unit cells (111(i+1)–111(n)) are discharged through a discharge circuit, that is, a plus terminal of 111(i+1)→Rfbi→an output terminal of OPi→Vop− of OPi→a minus terminal of 111(n). On the other hand, if Pai is lower than Pbi, higher level unit cells (111(i)–111(1)) are discharged through a discharge circuit, that is, a plus terminal of 111(1)→Vop+ of OPi→an output terminal of OPi→Rfbi→a minus terminal of 111(i). In this manner, the cell potential Pai and the divided potential Pbi are equalized for all of the unit cells. Thus, voltage unevenness among the unit cells is eliminated.

(Fifth Embodiment)

Figure 14:
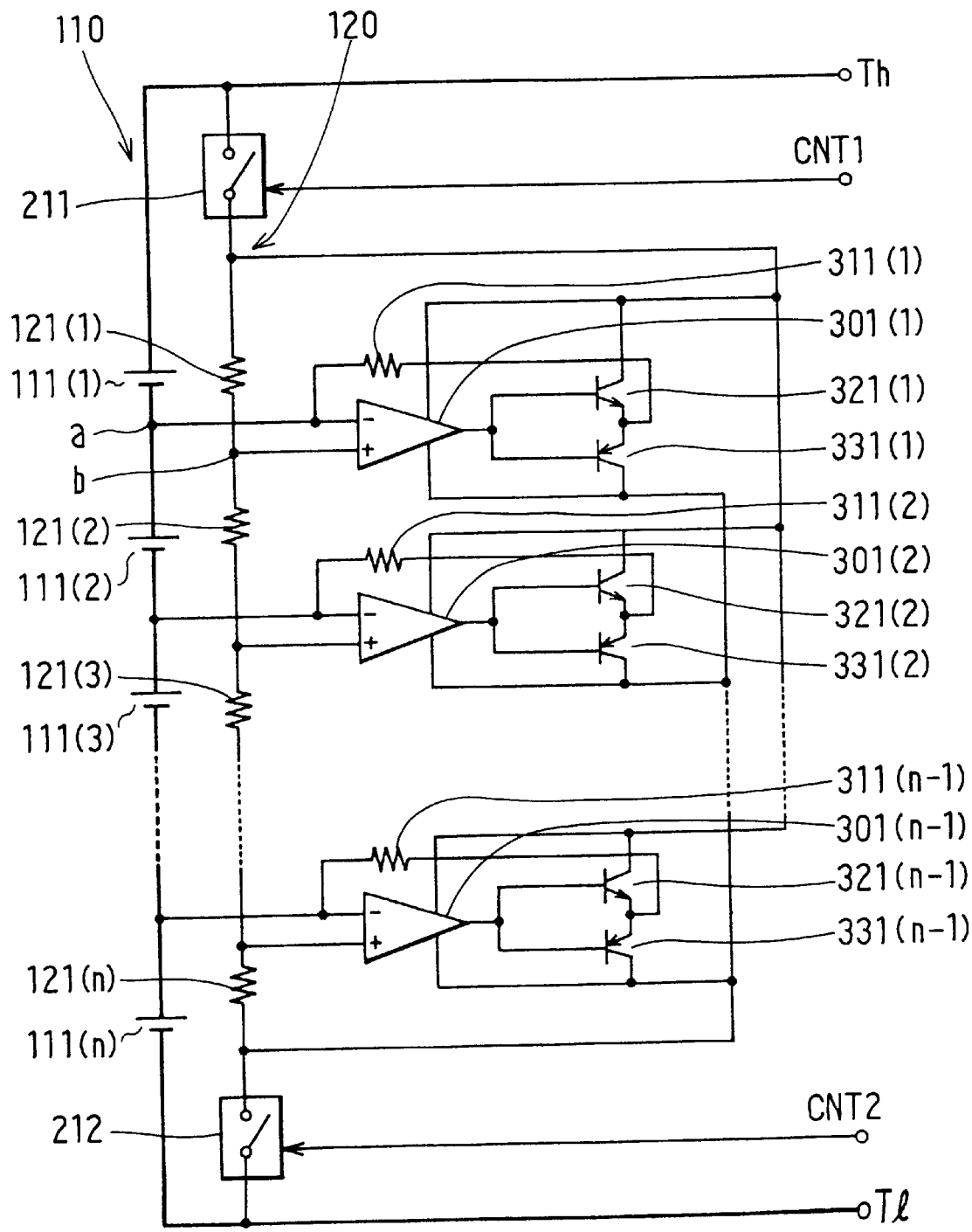
FIG. 14 is a circuit diagram showing a voltage balancer device as a fifth embodiment of the present invention.

Referring to FIG. 14, a fifth embodiment of the present invention will be described. This embodiment is similar to the fourth embodiment except that a complementary transistor circuit consisting of an NPN transistor 321(i) and a PNP transistor 331(1) is additionally connected to the output terminal of the operation amplifier 301(i) and that two switches 211, 212 which are opened or closed according to signals sent from control terminals CNT1, CNT2 are additionally inserted in the voltage divider circuit 120. The PNP transistor 331(i) turns on when the output of the operation amplifier 301(i) is low, while the NPN transistor 321(i) turns on when the output of the operation amplifier 301(i) is high. This embodiment operates in the same manner as the fourth embodiment. Namely, the cell potential Pai is compared with the divided potential Pbi, and unit cells having a higher voltage are discharged to eliminate voltage unevenness among the unit cells.

Since the discharge current flows through the complementary transistor circuit in this embodiment, as opposed to the fourth embodiment in which the discharge current flows through the operation amplifier, an amount of the discharge current is not limited by the operation amplifier. Accordingly, the voltage unevenness among the unit cells can be more quickly eliminated. In addition, since the switches 211, 212 are added in the voltage divider circuit 120, over-discharge of the combination battery 110 is avoided by opening the switches if the terminal voltage of the combination battery 110 is lower than a predetermined level.

(Sixth Embodiment)

Figure 15:
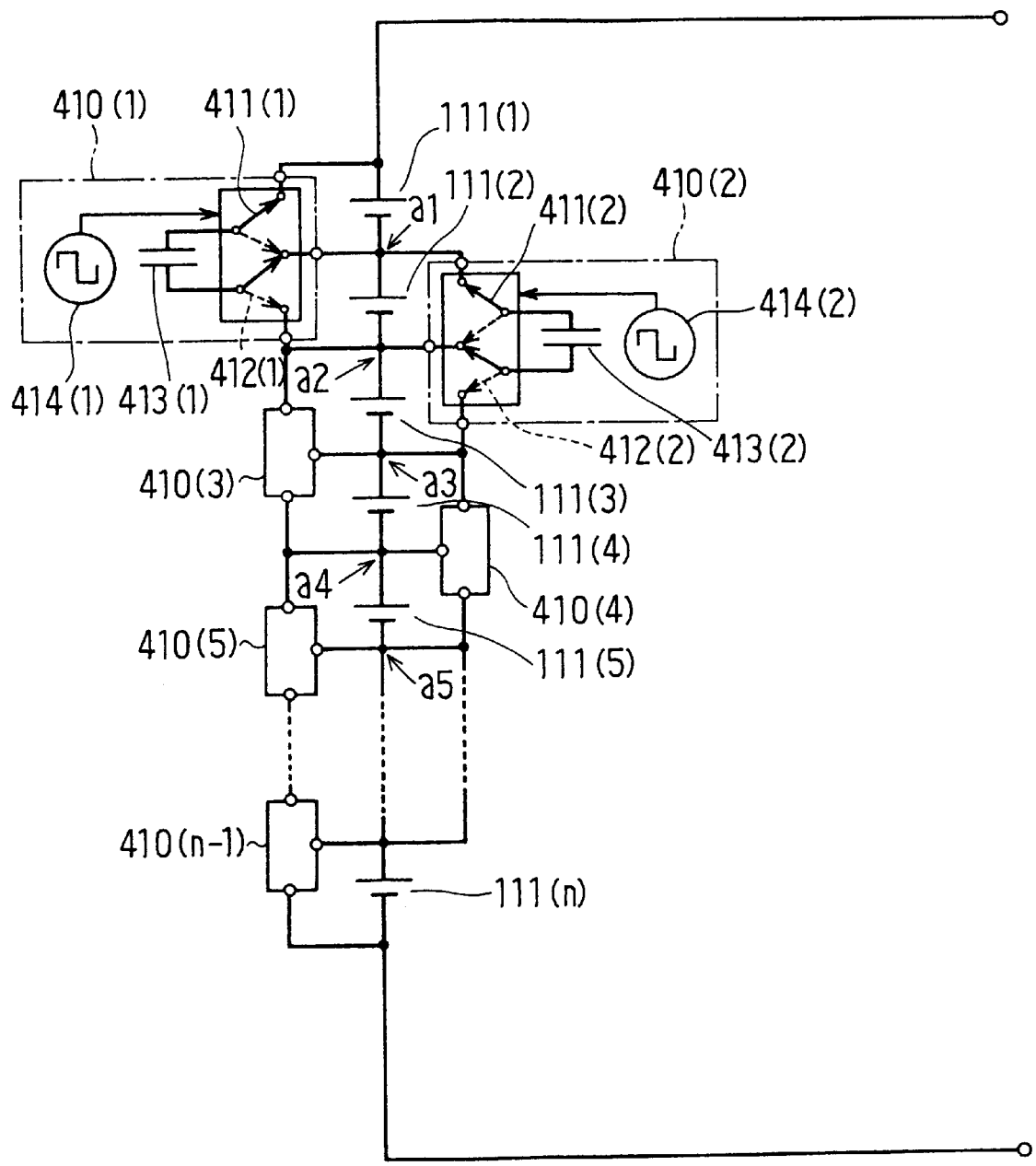
FIG. 15 is a block diagram showing a whole structure of a voltage balancer device as a sixth embodiment of the present invention.
Figure 17:
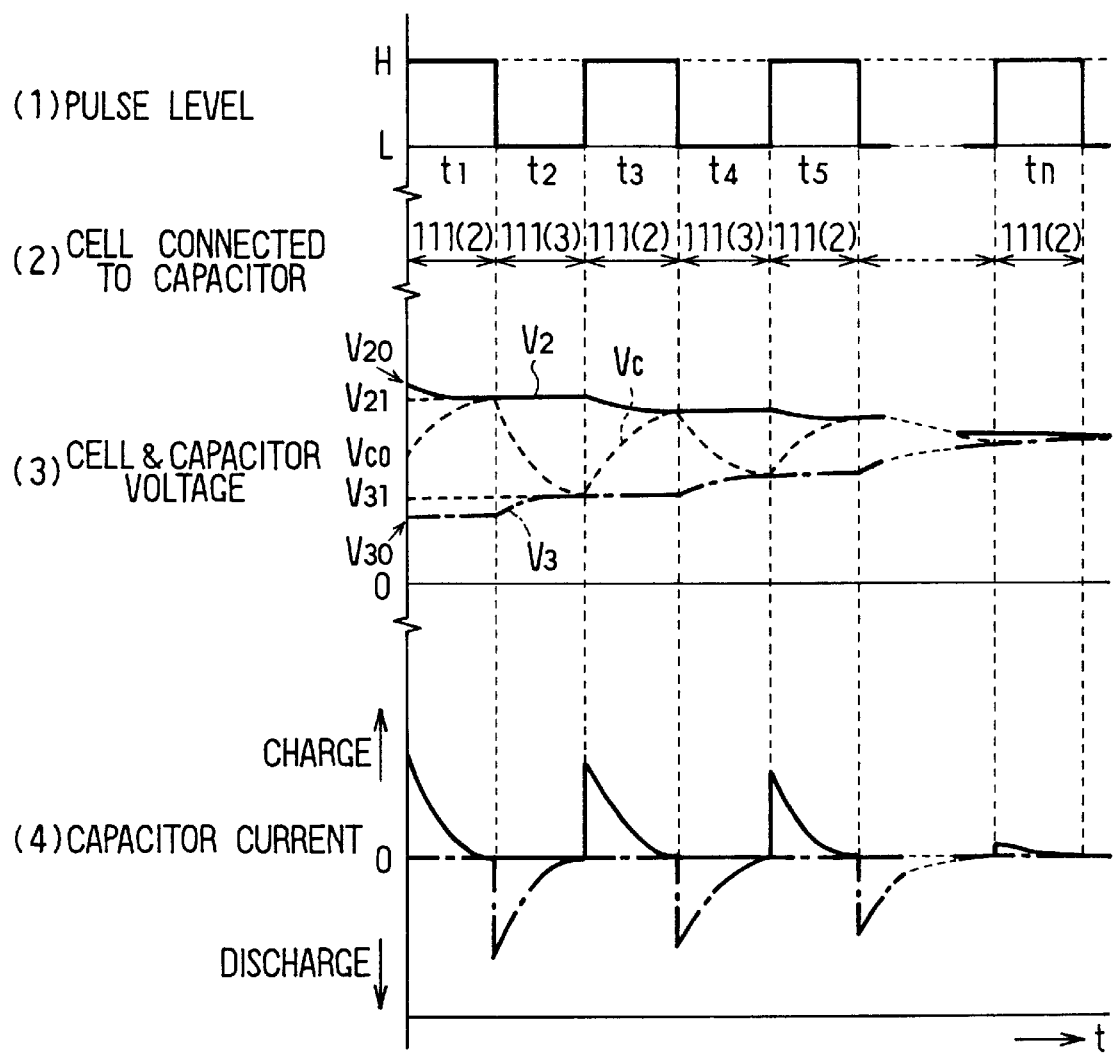
FIG. 17 is a timing chart showing operation of the sixth embodiment.

Referring to FIGS. 15 and 17, a sixth embodiment of the present invention will be described. N unit cells 111(1)–111(n) such as rechargeable lithium battery cells are connected in series, forming a combination battery. Voltage correction circuits 410(1)–410(n−1) are connected to each pair of neighboring unit cells. Each voltage correction circuit 410(i) is composed of a pair of interlinked switches 411(i) and 412(i), a capacitor 413(i) connected to the interlinked switches and an oscillator circuit 414(i) for controlling switching timing of the switches.

In the voltage correction circuit 410(1), the switch 411(1) selects either a plus terminal or a minus terminal of the unit cell 111(1),plus the switch 412(1) selects either a plus terminal or a minus terminal of the unit cell 111(2). Both switches 411(1) and 412(1) are interlinked and move simultaneously in a same direction as shown in FIG. 15. Thus, the pair of interlinked switches selectively connect the capacitor 413(1) to either unit cell 111(1) or 111(2). A selected unit cell is discharged if its voltage is higher than a capacitor voltage, while it is charged if its voltage is lower than the capacitor voltage. The oscillator 414(1) controls switching timing of the switches 411(1), 412(1). The unit cell 111(1) is connected in parallel to the capacitor 413(1) when the oscillator outputs a high level signal, and the unit cell 111(2) is connected in parallel to the capacitor 413(1) when the oscillator outputs a low level signal.

The voltage correction circuit 410(2) is connected to the unit cells 111(2) and 111(3), and a pair of switches 411(2) and 412(2) select either the unit cell 111(2) or 111(3). Other voltage correction circuits 410(3)–410(n−1) are connected to respective unit cells in the same manner. The oscillator 414 may be commonly used for all or a part of the voltage correction circuits, or may be separately provided for each voltage correction circuit as in the embodiment shown in FIG. 15. Two neighboring correction circuits are synchronized to avoid a closed circuit between neighboring capacitors. For example, when the voltage correction circuit 410(1) selects the unit cell 111(1), the next voltage correction circuit 410(2) selects the unit cell 111(2) (not the unit cell 111(3)).

Figure 16:
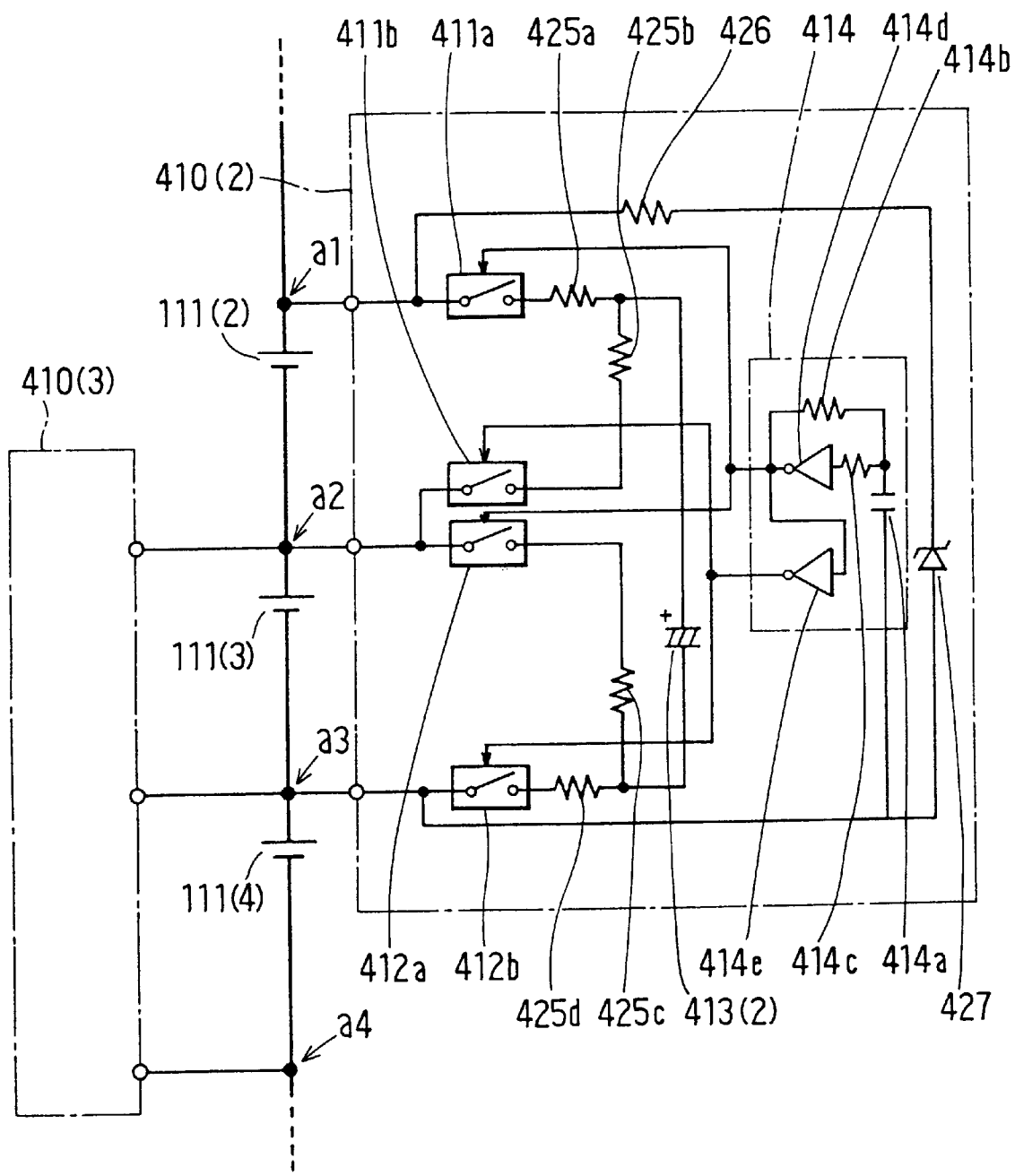
FIG. 16 is a circuit diagram showing details of a portion of the sixth embodiment.

Details of the voltage correction circuit will be described, referring to FIG. 16 which shows the voltage correction circuit 410(2) as an example. The voltage correction circuit 410(2) is connected to the unit cells 111(2) and 111(3), and alternately connects one of two unit cells in parallel to the capacitor 413(2) according to the signal fed from the oscillator circuit 414. A junction a1 is a point connecting the unit cells 111(1) and 111(2), a junction a2 is a point connecting the unit cells 111(2) and 111(3), and a junction a3 is a point connecting the unit cells 111(3) and 111(4).

The oscillator circuit 414 is composed of a capacitor 414a, two inverters 414d, 414e and two resistances 414b, 414c. These components are connected as shown in FIG. 16. The oscillator circuit 414 generates an oscillation signal having a frequency determined by the capacitor 414a and the resistance 414b. The oscillation signal is fed to the switches from the inverter 414d, and an inverted oscillation signal is fed to the switches from the inverter 414e.

The switch 411 includes two switches 411a and 411b. The switch 411a is connected between the junction a1 and the capacitor 413(2) through a resistance 425a, and is opened or closed by the oscillation signal fed from the inverter 414d. The switch 411b is connected between the junction a2 and the capacitor 413(2) through a resistance 425b, and is opened or closed by the inverted oscillation signal fed from the inverter 414e. The switch 411a turns on when the oscillation signal is a high level and turns off when the signal is a low level. The switch 411b turns on when the inverted oscillation signal is a high level and turns off when the signal is a low level. Thus, when either one of the switches 411a, 411b is turned on, the other is turned off. Similarly, the switch 412 includes two switches 412a and 412b. The switch 412a is connected between the junction a2 and the capacitor 413(2) through a resistance 425c, and is opened or closed by the oscillation signal fed from the inverter 414d. The switch 412b is connected between the junction a3 and the capacitor 413 (2) through a resistance 425d, and is opened or closed by the inverted oscillation signal fed from the inverter 414e. The switch 412a turns on when the oscillation signal is a high level and turns off when the signal is a low level. The switch 412b turns on when the inverted oscillation signal is a high level and turns off when the signal is a low level. Thus, when either one of the switches 412a, 412b is turned on, the other is turned off. The voltage correction circuit 410(2) also includes a protection circuit composed of a resistance 426 and a Zener diode 427 connected in series. The protection circuit is connected between the junctions a1 and a3.

Operation of the voltage correction circuit 410(2) will be described in reference to FIG. 17. The graphs in FIG. 17 show, from the top thereof, (1) the pulse level of the oscillation signal supplied form the inverter 414d, (2) the unit cell connected in parallel to the capacitor 413(2), (3) voltages $V_2$, $V_3$ of the unit cells 111(2), 111(3) and the voltage $V_c$ of the capacitor 413(2), and (4) current charging or discharging the capacitor 413(2). Let's assume that the initial voltage $V_{20}$ of the unit cell 111(2) is higher than the initial voltage $V_{30}$ of the unit cell 111(3), and that the initial voltage $V_{c0}$ of the capacitor 413(2) is inbetween $V_{20}$ and $V_{30}$, that is, $V_{20} > V_{c0} > V_{30}$. In a period t1 when the signal level is high (the inverted signal level is low), the switches 411a, 412a are turned on and the unit cell 111(2) is connected to the capacitor 413(2). Since $V_{20}$ is higher than $V_{c0}$ at this moment, the unit cell 111(2) charges the capacitor 413(2), and thereby $V_{20}$ is lowered to $V_{21}$, and $V_{c0}$ increases to the level of $V_{21}$. In the next period t2 when the signal level is low (the inverted signal level is high), the switches 411b, 412b are turned on, and the unit cell 111(3) is connected to the capacitor 413(2). Since $V_{30}$ is lower than $V_c$ ($=V_{21}$), the capacitor 413(2) charges the unit cell 111(3), and thereby $V_c$ is lowered to $V_{31}$ and the unit cell voltage $V_{30}$ increases to the level of $V_{31}$. In periods t3, t4 . . . tn, the same operation is repeated, and thereby a voltage difference between two unit cells 111(2), 111(3) is gradually decreased and finally both voltages $V_2$ and $V_3$ are substantially equalized. The frequency of the oscillation signal is selected so that the signal level is switched (from a high level to a low level, vice versa) when the charging or discharging current converges to substantially zero in each period (t1–tn). Preferably, a duty ratio of the oscillation signal pulse is set at 1:1.

Other voltage correction circuits 410(i) operate in the same manner. Since the voltage correction circuit 410(i) is connected to the unit cells 111(i) and 111(i+1) in an overlapped manner as shown in FIG. 15, the voltage unevenness among all of the unit cells 111(i) is eliminated. By eliminating the voltage unevenness, the state of charge (SOC) of all the unit cells is equalized.

(Seventh Embodiment)

Figure 18:
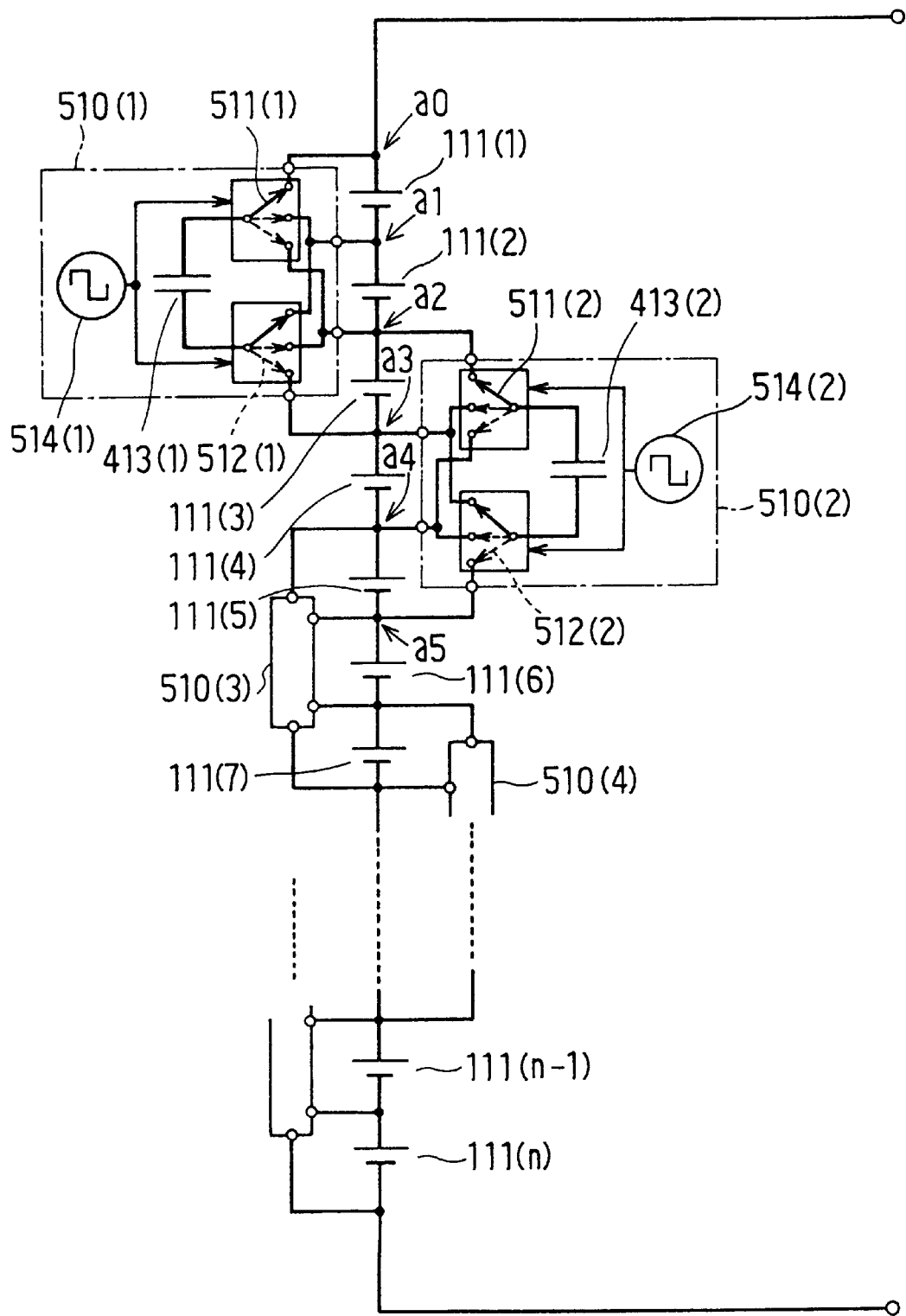
FIG. 18 is a block diagram showing a voltage balancer device as a seventh embodiment of the present invention.
Figure 19:
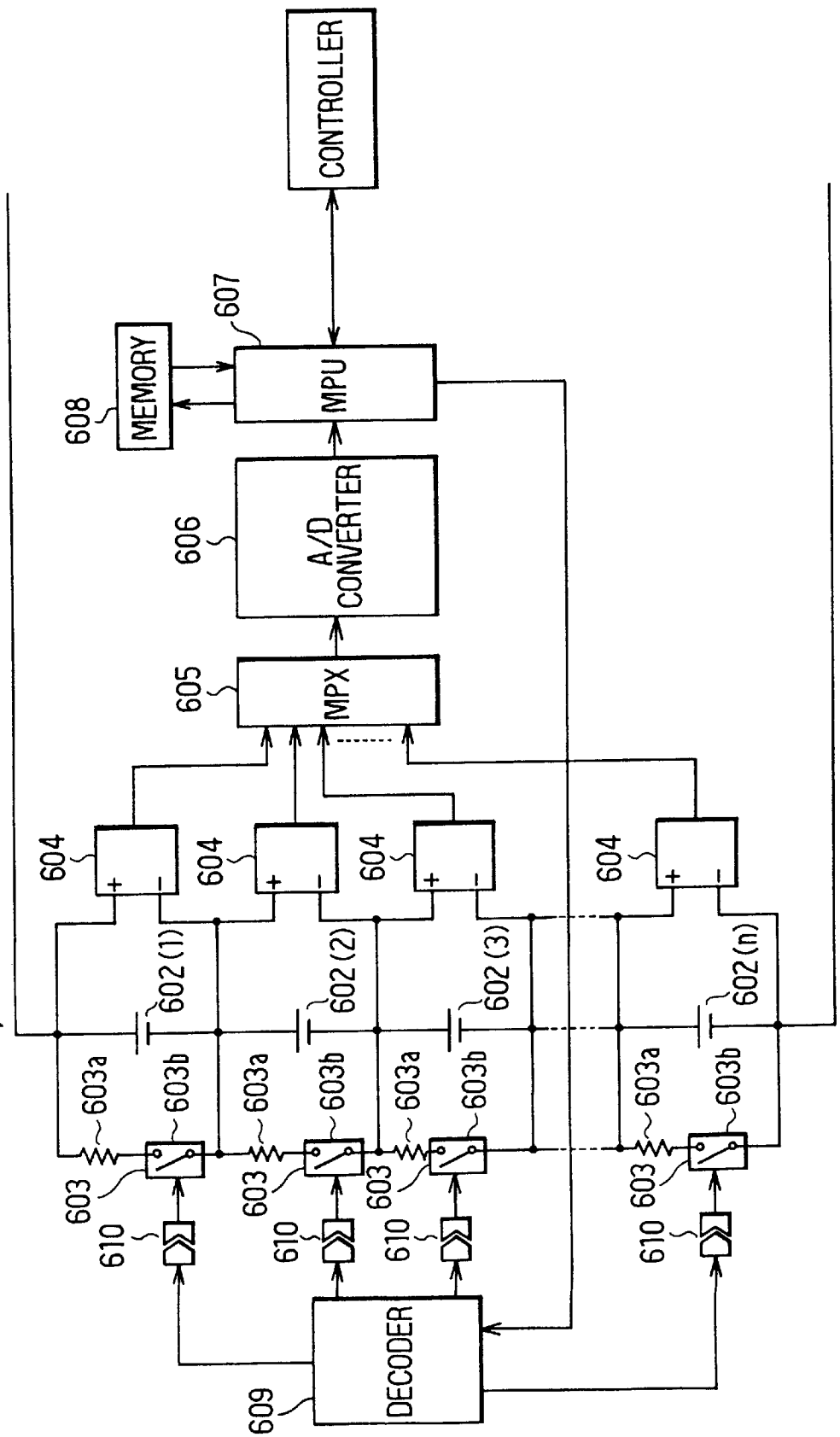
FIG. 19 is a block diagram showing a conventional voltage balancer device.

Referring to FIG. 18, a third embodiment will be described. This embodiment is similar to the sixth embodiment shown in FIG. 15 except that three unit cells are controlled by one voltage correction circuit. The unit cells 111(i) are connected in series, forming the combination battery. Junctions of the unit cells connected in series are named a0, a1, a2 . . . an from the top of the combination battery as shown in FIG. 18. Each voltage correction circuit 511(i) is connected to three unit cells in an overlapped manner. For example, the voltage correction circuit 510(1) is connected to the unit cells 111(1), 111(2), 111(3), and the next voltage correction circuit 510(2) is connected to the unit cells 111(3), 111(4), 111(5), so that the unit cell 111(3) is connected to both voltage correction circuits 510(1), 510(2).

The structure and operation of the voltage correction circuit 510(i) will be described, taking the voltage correction circuit 510(1) as an example because all others are identical thereto. The voltage correction circuit 510(1) is composed of a pair of three-way switches 511(1), 512(1), which are interlinked to each other, a capacitor 413(1), and an oscillator circuit 514(1). The switch 511(1) selectively connects the junctions a0, a1, a2 to one terminal of the capacitor 413(1). The switch 512(1) selectively connects the junctions a1, a2, a3 to the other terminal of the capacitor 413(1). Three-way switching of both switches 511(1), 512(1) is interlinked and triggered by the signal pulse fed from the oscillator circuit 514(1). When the switch 511(1) is connected to the junction a0, the other switch 512(1) is connected to the junction a1. When the switch 511(1) is connected to the junction a1, the other switch 512(1) is connected to the junction a2. Similarly, when the switch 511(1) is connected to the junction a2, the other switch 512(1) is connected to the junction a3. Thus, one unit cell 111(1), 111(2) or 111(3) is sequentially selected and connected to the capacitor 413(1). If a voltage of a selected unit cell is higher than the capacitor voltage, that cell is discharged, and if it is lower, that cell is charged from the capacitor, in the same manner as in the sixth embodiment. Other voltage correction circuits 510(i) operate in the same manner. Since they are overlapped with each other, all the unit cell voltages are equalized.

Though each voltage correction circuit 510(i) connected to three unit cells 111(i) in the seventh embodiment, the number of the unit cells controlled by one voltage correction circuit may be arbitrarily selected. For example the number of the unit cells may be four, five or more. The larger the number of cells in one group is, the less number of the voltage correction circuits is required. However, if the number of the unit cells in one group is too large, the correction circuit becomes more complex. Therefore, the number of the unit cells in one group has to be properly selected according to individual applications. The capacitor 413(i) may be replaced by a rechargeable battery of any kind.

Though the present invention is advantageous if it is applied to the control of rechargeable lithium battery, but the present invention may be applied also to the control of other batteries such as lead-acid, nickel-cadmium or nickel-hydrogen batteries.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A voltage balancer device for a combination battery, the combination battery having a plurality of at least three of rechargeable cells connected in series, the voltage balancer device comprising:

a potential divider circuit connected in parallel to the combination battery for detecting an average voltage of all of said cells;

a comparator for comparing the average voltage of all of said cells with an actual voltage of each of said cells; and means for discharging the cells having a voltage higher than the average voltage to eliminate voltage unevenness among the cells.

2. The voltage balancer device as in claim 1, wherein:

the potential divider circuit comprises a plurality of equal resistances, each corresponding to each cell for detecting the average voltage of all of said cells.

3. The voltage balancer device as in claim 2, wherein:

the comparator includes an operational amplifier driven by the combination battery; and the discharging means includes the operational amplifier as a part thereof.

4. The voltage balancer device according to claim 3, wherein the number of cells in said plurality of rechargeable cells is designated by n, each cell in said series being designated in order by a number from 1 through n, and wherein the point at which said first cell and said first resistance are connected is designated as a common point, and wherein said comparator determines that the first cell has an individual voltage higher than the average voltage when a magnitude of a potential across the first cell is greater than a magnitude of a potential across the first resistance, and wherein said comparator determines that the n-th cell has an individual voltage higher than the average voltage when a magnitude of a potential between the common point and a point between the (n−1)-th and n-th cells is less than a magnitude of a potential between the common point and a point between the (n−1)-th and n-th resistances, and wherein said comparator determines that the i-th cell has an individual voltage higher than the average voltage when one among the following two conditions is satisfied, i being an integer from 2 to (n−1) and all potentials being with reference to the common point:

1) a magnitude of a potential at a point between the i-th and (i+1)-th cells is not less than a magnitude of a potential at a point between the i-th and the (i+1)-th resistances, and a magnitude of a potential at a point between the (i−1)-th and i-th cells is less than a magnitude of a potential at a point between the (i−1)-th and the i-th resistances, and 2) a magnitude of a potential at a point between the i-th and (i+1)-th cells is higher than a magnitude of a potential at a point between the i-th and the (i+1)-th resistances, and a magnitude of a potential at a point between the (i−1)-th and i-th cells is not higher than a magnitude of a potential at a point between the (i−1)-th and the i-th resistances.

5. The voltage balancer device as in claim 1, wherein: the comparator compares the average voltage of all of said cells with a plurality of actual voltages of each of the cells.

6. The voltage balancer device as in claim 1, wherein: the plurality of rechargeable cells constituting the combination battery are lithium battery cells in which lithium ions are exchanged between a positive electrode and a negative electrode thereof.

7. The voltage balancer device as in claim 1, wherein: an operating power of the comparator and the discharging means is supplied from the combination battery.

8. The voltage balancer device as in claim 1, wherein: the comparator includes an amplifier for amplifying a voltage difference between the actual voltage of a cell and the average voltage of all of said cells.

9. The voltage balancer device as in claim 1, wherein: the combination battery is used as a power source for an electric vehicle or a hybrid electric vehicle.

10. A combination battery system including a plurality of battery modules connected in series and means for eliminating voltage unevenness among the battery modules, at least one battery module comprising:

a group of at least three rechargeable cells connected in series;

a potential divider circuit connected in parallel to the group of rechargeable cells for detecting an average voltage of all of said cells;

a comparator for comparing the average voltage of all of said cells with an actual voltage of each of said cells; and means for discharging the cells having a voltage higher than the average voltage to eliminate voltage unevenness among the cells in the group.

11. A voltage balancer device for a combination battery, the combination battery having a plurality of at least three rechargeable cells connected in series at respective cell junctions, the voltage balancer device comprising:

a potential divider circuit connected in parallel to the combination battery, the potential divider circuit having a plurality of resistances connected in series at respective divider junctions for equally dividing a whole potential of the combination battery according to the number of cells, each divider junction corresponding to each cell junction;

a comparator for comparing a potential of a divider junction with a potential of the cell junction corresponding to that divider junction; and means for discharging the cells which are located at a higher potential side of the combination battery when the potential of the divider junction is higher than the potential of the cell junction corresponding to that divider junction, and for discharging the cells which are located at a lower potential side of the combination battery when the potential of the divider junction is lower than the potential of the cell junction corresponding to that divider junction.

12. A method of eliminating voltage unevenness among a plurality of at least three rechargeable cells connected in series forming a combination battery, the method comprising steps of:

detecting an average voltage of all of said cells;

comparing the average voltage with a voltage of each cell; and discharging the cells having a higher voltage than the average voltage, so that the voltages of each of the cells become substantially equal to each other.

13. A voltage balancer device for a combination battery, the combination battery having a plurality of number n rechargeable cells connected in series, n being at least 3 and each cell in said series being designated in order by a number from 1 through n, the voltage balancer device comprising:

a potential devider circuit connected in parallel to the combination battery and detecting an average voltage of all of said cells, each potential divider circuit comprising n equal resistances connected in series, each resistance in said series being designated in order by a number from 1 through n;

a comparator for comparing the average of all of said cells with an individual voltage of each of the cells; and a discharging circuit for discharging the cells having an individual voltage higher than the average voltage.

14. The voltage balancer device according to claim 13, wherein the point at which said first cell and said first resistance are connected is designated as a common point, and wherein said comparator determines that the first cell has an individual voltage higher than the average voltage when a magnitude of a potential across the first cell is greater than a magnitude of a potential across the first resistance, and wherein said comparator determines that the n-th cell has an individual voltage higher than the average voltage when a magnitude of a potential between the common point and a point between the (n−1)-th and the n-th is less than a magnitude of a potential between the common point and a point between the (n−1)-th and the n-th resistances, and wherein said comparator determines that the i-th cell has an individual voltage higher than the average voltage when one among the following two conditions is satisfied, i being an integer from 2 to (n−1) and all potentials being with reference to the common point:

1) a magnitude of a potential at a point between the i-th and (i+1)-th cells is not less than a magnitude of a potential at a point between the i-th and the (i+1)-th resistances, and a magnitude of a potential at a point between the (i−1)-th and the i-th cells is less than a magnitude of a potential at a point between the (i−1)-th and the i-th resistances, and 2) a magnitude of a potential at a point between the i-th and (i+1)-th cells is higher than a magnitude of a potential at a point between the i-th and the (i+1)-th resistances, and a magnitude of a potential at a point between the (i−1)-th and the i-th cells is not higher than a magnitude of a potential at a point between the (i−1)-th and the i-th resistances.

* * * * *